(12) United States Patent
Tomic et al.

(10) Patent No.: US 12,418,559 B2
(45) Date of Patent: *Sep. 16, 2025

(54) METHOD FOR EMULATING AN ATTACK ON AN ASSET WITHIN A TARGET NETWORK

(71) Applicant: AttackIQ, Inc., San Diego, CA (US)

(72) Inventors: George Tomic, San Diego, CA (US); Andres Gazzoli, San Diego, CA (US); Pablo Caballero, San Diego, CA (US); Raul Lopez, San Diego, CA (US); Franco Ardiani, San Diego, CA (US); Juan Pablo Fuertes, San Diego, CA (US); Rajesh K. Sharma, San Diego, CA (US)

(73) Assignee: AttackIQ, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/029,580

(22) Filed: Jan. 17, 2025

(65) Prior Publication Data

US 2025/0168189 A1    May 22, 2025

Related U.S. Application Data

(63) Continuation-in-part of application No. 18/947,566, filed on Nov. 14, 2024, and a continuation-in-part of
(Continued)

(51) Int. Cl.
*H04L 9/40*    (2022.01)
(52) U.S. Cl.
CPC ...... *H04L 63/1433* (2013.01); *H04L 63/1416* (2013.01); *H04L 63/1425* (2013.01); *H04L 63/1466* (2013.01)

(58) Field of Classification Search
None
See application file for complete search history.

(56) References Cited

U.S. PATENT DOCUMENTS 6,907,396 B1 * 6/2005 Muttik ............... G06F 21/56
703/22
7,409,712 B1 * 8/2008 Brooks ............ H04L 63/1458
726/13

(Continued)

*Primary Examiner* — Amare F Tabor
*Assistant Examiner* — Mahabub S Ahmed
(74) *Attorney, Agent, or Firm* — Run8 Patent Law Group, LLC; Peter Miller; Brian T. Chew

(57) ABSTRACT

One variation of a method includes: generating data packets by recombining packet fragments transmitted between machines during a prior malicious attack on a reference network; defining triggers for transmission of the data packets between pairs of assets connected to a target network; generating an executable file including the data packets and the triggers; initiating transmission of the data packets between the pairs of assets according to the triggers to emulate the malicious attack on the target network; serving a context file, specifying artifacts representing indicators of the malicious attack responsive to execution of behaviors corresponding to these triggers, to a security technology deployed on the target network; and, in response to absence of an event record related to the emulation in a log of the security technology, generating a prompt to reconfigure the security technology to respond to the malicious attack.

20 Claims, 9 Drawing Sheets

Related U.S. Application Data application No. 18/782,843, filed on Jul. 24, 2024, and a continuation-in-part of application No. 18/434,328, filed on Feb. 6, 2024, which is a continuation-in-part of application No. 18/529,968, filed on Dec. 5, 2023, now Pat. No. 12,177,244, said application No. 18/947,566 is a continuation of application No. 18/529,968, filed on Dec. 5, 2023, now Pat. No. 12,177,244, said application No. 18/782,843 is a continuation of application No. 18/141,888, filed on May 1, 2023, now Pat. No. 12,081,580, said application No. 18/529,968 is a continuation of application No. 18/087,360, filed on Dec. 22, 2022, now Pat. No. 11,876,829, said application No. 18/141,888 is a continuation of application No. 17/832,106, filed on Jun. 3, 2022, now Pat. No. 11,677,775, which is a continuation-in-part of application No. 17/083,275, filed on Oct. 28, 2020, now Pat. No. 11,563,765, said application No. 18/087,360 is a continuation of application No. 17/083,275, filed on Oct. 28, 2020, now Pat. No. 11,563,765.

(60) Provisional application No. 63/196,320, filed on Jun. 3, 2021, provisional application No. 63/008,451, filed on Apr. 10, 2020.

(56) References Cited

U.S. PATENT DOCUMENTS

| | | | | |
|---|---|---|---|---|
| 9,292,695 | B1* | 3/2016 | Bassett | G06F 21/577 |
| 9,516,057 | B2* | 12/2016 | Aziz | H04L 63/1491 |
| 9,686,296 | B1* | 6/2017 | Murchison | H04L 63/08 |
| 9,843,596 | B1* | 12/2017 | Averbuch | G06F 21/554 |
| 10,764,313 | B1* | 9/2020 | Mushtaq | G06N 20/00 |
| 10,931,713 | B1* | 2/2021 | Allam | H04L 63/1483 |
| 11,057,428 | B1* | 7/2021 | Sellers | G06F 16/27 |
| 11,693,961 | B2* | 7/2023 | Duo | H04L 63/1433 726/22 |
| 2003/0208616 | A1* | 11/2003 | Laing | H04L 69/22 709/236 |
| 2004/0003286 | A1* | 1/2004 | Kaler | G06F 21/554 726/25 |
| 2006/0123480 | A1* | 6/2006 | Oh | H04L 63/1408 726/23 |
| 2007/0192867 | A1* | 8/2007 | Miliefsky | G06F 21/577 726/25 |
| 2008/0109905 | A1* | 5/2008 | Grosse | H04L 63/1458 726/23 |
| 2008/0271146 | A1* | 10/2008 | Rooney | H04L 63/1425 726/23 |
| 2008/0289039 | A1* | 11/2008 | Rits | H04L 63/123 726/22 |
| 2009/0013194 | A1* | 1/2009 | Mir | G06F 21/577 713/193 |
| 2009/0044270 | A1* | 2/2009 | Shelly | H04L 63/02 726/22 |
| 2010/0325412 | A1* | 12/2010 | Norrman | G06Q 10/06 726/25 |
| 2011/0185432 | A1* | 7/2011 | Sandoval | H04L 63/1433 726/25 |
| 2012/0144476 | A1* | 6/2012 | McClure | G02B 6/12011 370/254 |
| 2013/0160084 | A1* | 6/2013 | Hansen | G06F 21/6218 726/4 |
| 2013/0312092 | A1* | 11/2013 | Parker | H04L 63/1408 726/22 |
| 2014/0325634 | A1* | 10/2014 | Iekel-Johnson | H04L 63/101 726/13 |
| 2014/0380488 | A1* | 12/2014 | Datta Ray | H04L 63/1408 726/25 |
| 2015/0058987 | A1* | 2/2015 | Thure | G06F 21/565 726/23 |
| 2015/0180882 | A1* | 6/2015 | Le | G06F 21/54 726/23 |
| 2015/0230091 | A1* | 8/2015 | Sahu | H04L 43/18 455/410 |
| 2015/0295948 | A1* | 10/2015 | Hassell | H04L 63/1441 726/25 |
| 2016/0285907 | A1* | 9/2016 | Nguyen | H04L 63/1433 |
| 2017/0134400 | A1* | 5/2017 | Nguyen | H04L 63/1416 |
| 2017/0244745 | A1* | 8/2017 | Key | H04L 63/1408 |
| 2017/0339187 | A1* | 11/2017 | Papamartzivanos | G06N 3/126 |
| 2017/0346846 | A1* | 11/2017 | Findlay | H04L 63/1433 |
| 2018/0069874 | A1* | 3/2018 | Saeki | H04L 12/40 |
| 2018/0091527 | A1* | 3/2018 | Muthurajan | H04L 63/145 |
| 2018/0139224 | A1* | 5/2018 | Arnell | H04L 63/1408 |
| 2018/0239902 | A1* | 8/2018 | Godard | G06F 21/53 |
| 2018/0295519 | A1* | 10/2018 | Nandha Premnath | H04L 63/1425 |
| 2018/0307833 | A1* | 10/2018 | Noeth | H04L 63/20 |
| 2019/0190943 | A1* | 6/2019 | Boggs | H04L 63/1425 |
| 2019/0230106 | A1* | 7/2019 | Abbaszadeh | H04L 63/1441 |
| 2019/0258782 | A1* | 8/2019 | Lerner | G07C 9/257 |
| 2019/0281082 | A1* | 9/2019 | Carmichael | G06F 21/577 |
| 2019/0311121 | A1* | 10/2019 | Martin | H04L 63/1441 |
| 2020/0313847 | A1* | 10/2020 | Plusquellic | H04L 9/16 |
| 2020/0396232 | A1* | 12/2020 | Lee | G06F 11/3051 |
| 2021/0021637 | A1* | 1/2021 | Srivastava | H04L 63/0876 |
| 2021/0035116 | A1* | 2/2021 | Berrington | G06N 5/04 |
| 2021/0051162 | A1* | 2/2021 | Taylor | G06N 20/00 |
| 2021/0064751 | A1* | 3/2021 | Li | G06F 18/2413 |
| 2021/0064762 | A1* | 3/2021 | Salji | G06F 9/455 |
| 2021/0075686 | A1* | 3/2021 | Smith | G06N 5/022 |
| 2021/0089647 | A1* | 3/2021 | Suwad | G06F 21/552 |
| 2021/0092611 | A1* | 3/2021 | Pasricha | H04W 4/33 |
| 2021/0099468 | A1* | 4/2021 | Cabe | G06F 21/53 |
| 2021/0158360 | A1* | 5/2021 | Somani | H04L 63/0838 |
| 2021/0243220 | A1* | 8/2021 | Irimie | H04L 63/20 |
| 2021/0243226 | A1* | 8/2021 | El Gamal | H04L 63/1416 |
| 2022/0247772 | A1* | 8/2022 | Ishida | H04L 63/1425 |
| 2022/0279007 | A1* | 9/2022 | Kinoshita | H04L 63/1433 |
| 2023/0095085 | A1* | 3/2023 | Kerseboom | G08G 5/26 701/16 |

* cited by examiner

FIGURE 4

METHOD FOR EMULATING AN ATTACK ON AN ASSET WITHIN A TARGET NETWORK

CROSS-REFERENCE TO RELATED APPLICATIONS

This application is a continuation-in-part of U.S. patent application Ser. No. 18/434,328, filed on 6 Feb. 2024, which is a continuation-in-part of U.S. patent application Ser. No. 18/529,968, filed on 5 Dec. 2023, which is a continuation of U.S. patent application Ser. No. 18/087,360, filed on 22 Dec. 2022, which is a continuation of U.S. patent application Ser. No. 17/083,275, filed on 28 Oct. 2020, which claims the benefit of U.S. Provisional Patent Application No. 63/008,451, filed on 10 Apr. 2020, each of which is incorporated in its entirety by this reference.

This application is a continuation-in-part of U.S. patent application Ser. No. 18/782,843, filed on 24 Jul. 2024, which is a continuation of U.S. patent application Ser. No. 18/141,888, filed on 1 May 2023, which is a continuation of U.S. patent application Ser. No. 17/832,106, filed on 3 Jun. 2022, which claims the benefit of U.S. Provisional Application No. 63/196,320, filed on 3 Jun. 2021, each of which is incorporated in its entirety by this reference.

U.S. patent application Ser. No. 17/832,106, filed on 3 Jun. 2022, is a continuation-in-part of U.S. patent application Ser. No. 17/083,275, filed on 28 Oct. 2020, which claims the benefit of U.S. Provisional Application No. 63/008,451, filed on 10 Apr. 2020, each of which is incorporated in its entirety by this reference.

This application is a continuation-in-part of U.S. patent application Ser. No. 18/947,566, filed on 14 Nov. 2024, which is a continuation of U.S. patent application Ser. No. 18/529,968, filed on 5 Dec. 2023, which is a continuation of U.S. patent application Ser. No. 18/087,360, filed on 22 Dec. 2022, which is a continuation of U.S. patent application Ser. No. 17/083,275, filed on 28 Oct. 2020, which claims the benefit of U.S. Provisional Patent Application No. 63/008,451, filed on 10 Apr. 2020, each of which is incorporated in its entirety by this reference.

TECHNICAL FIELD

This invention relates generally to the field of computer network security and, more specifically, to a new and useful method for emulating an attack on an asset within the field of computer network security.

BRIEF DESCRIPTION OF THE FIGURES

Figure 4:
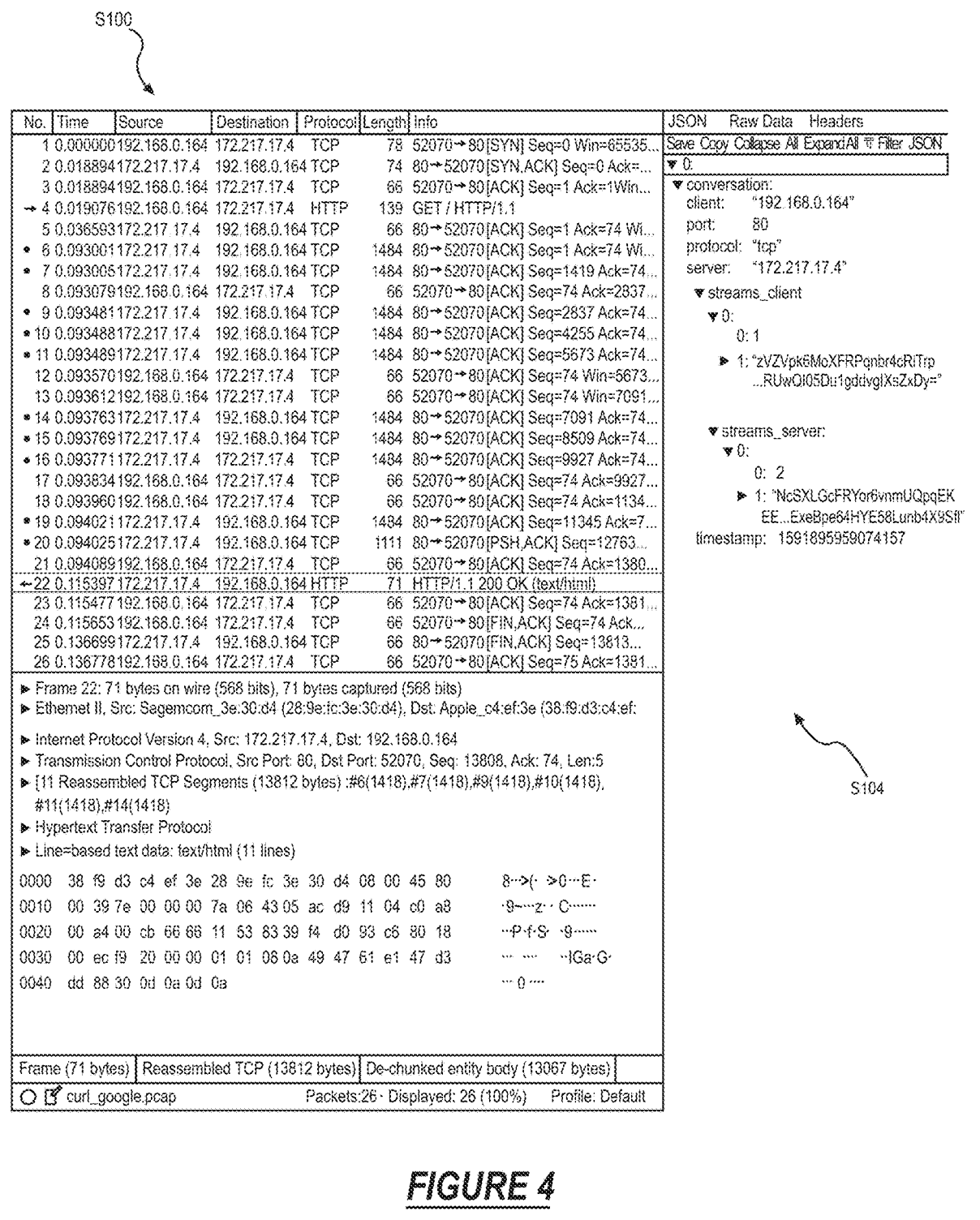

FIG. 4 is a flowchart representation of one variation of the method.

DESCRIPTION OF THE EMBODIMENTS

Figure 1:
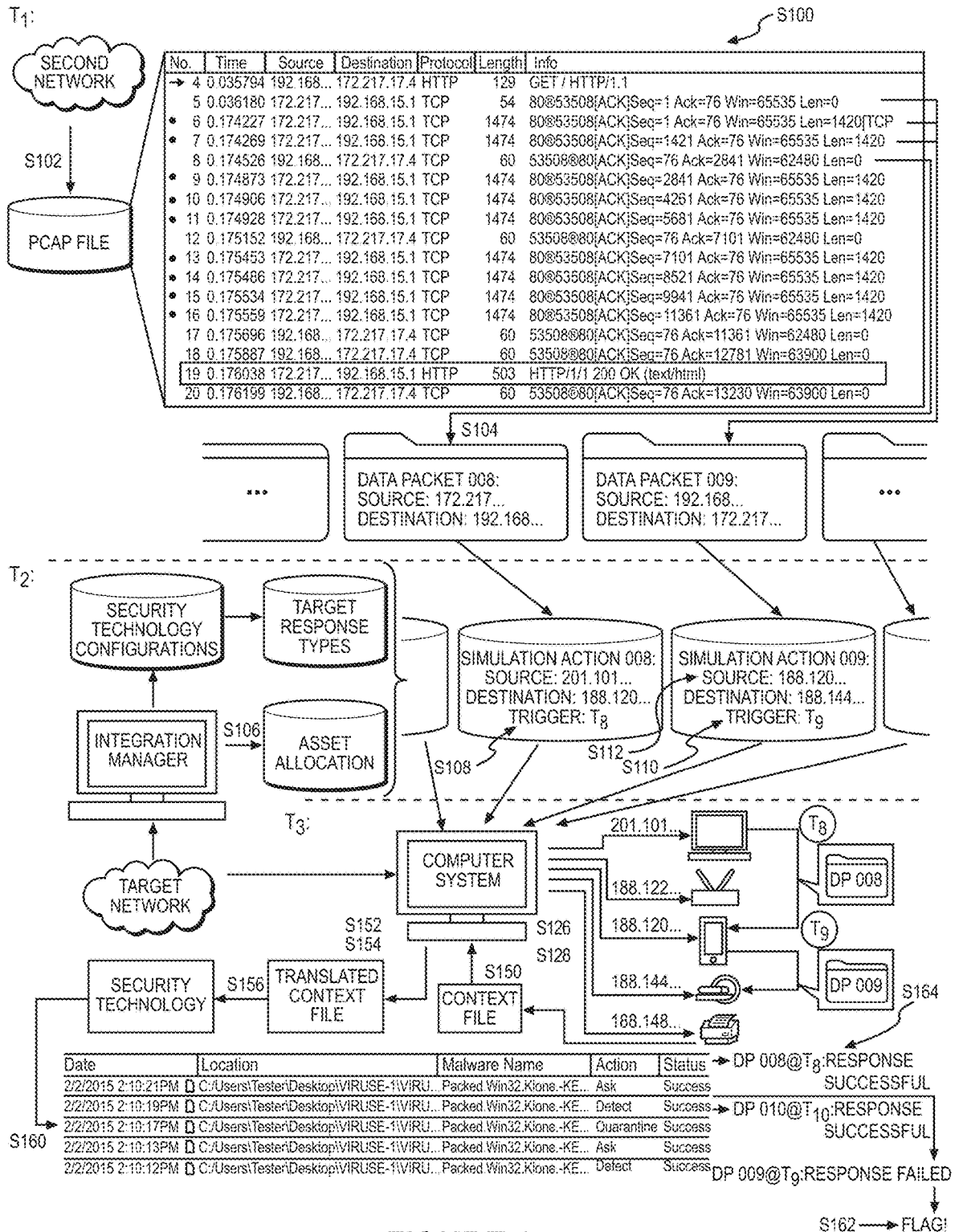
FIG. 1 is a flowchart representation of a method.
Figure 2:
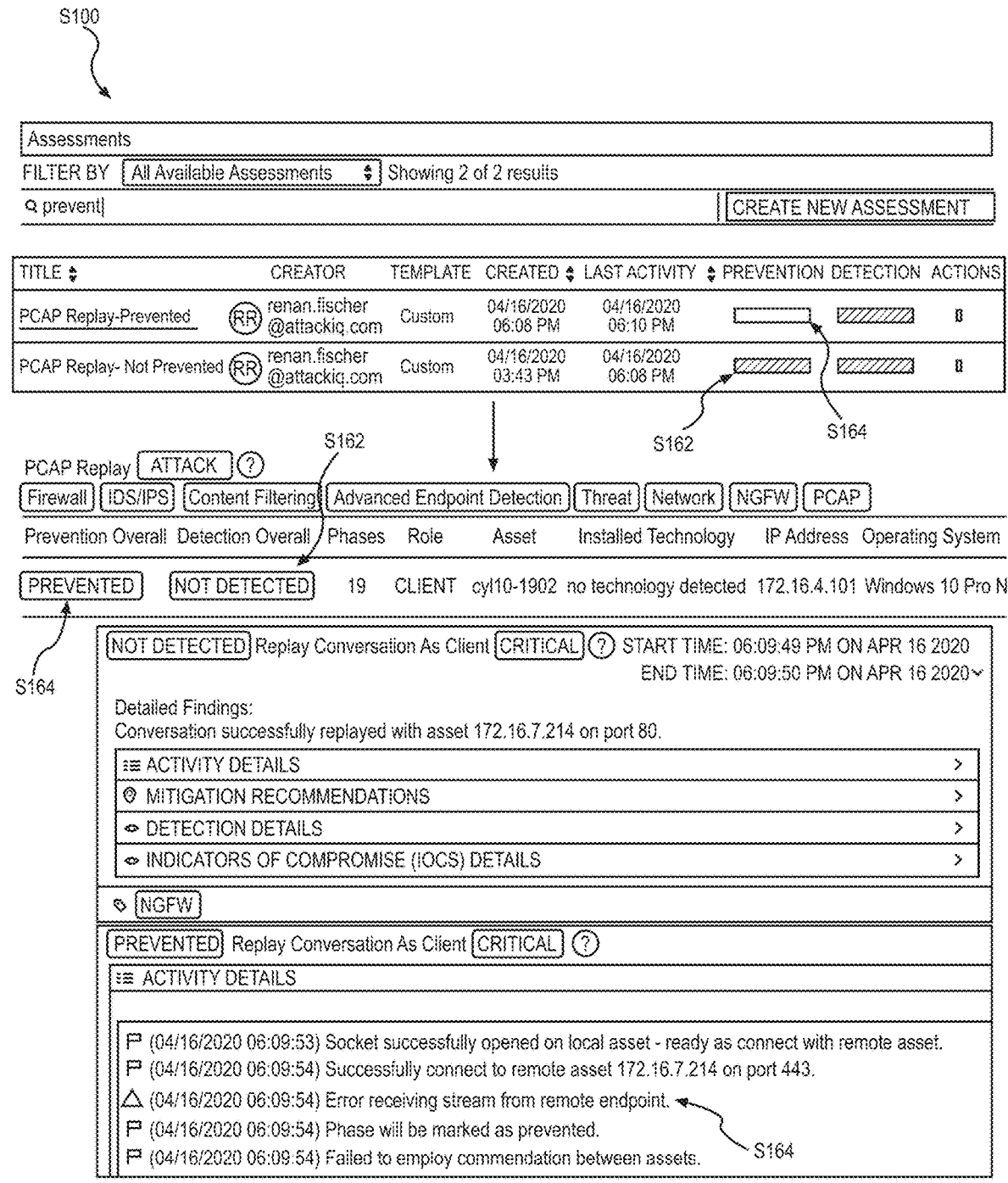
FIG. 2 is a flowchart representation of one variation of the method.
Figure 3:
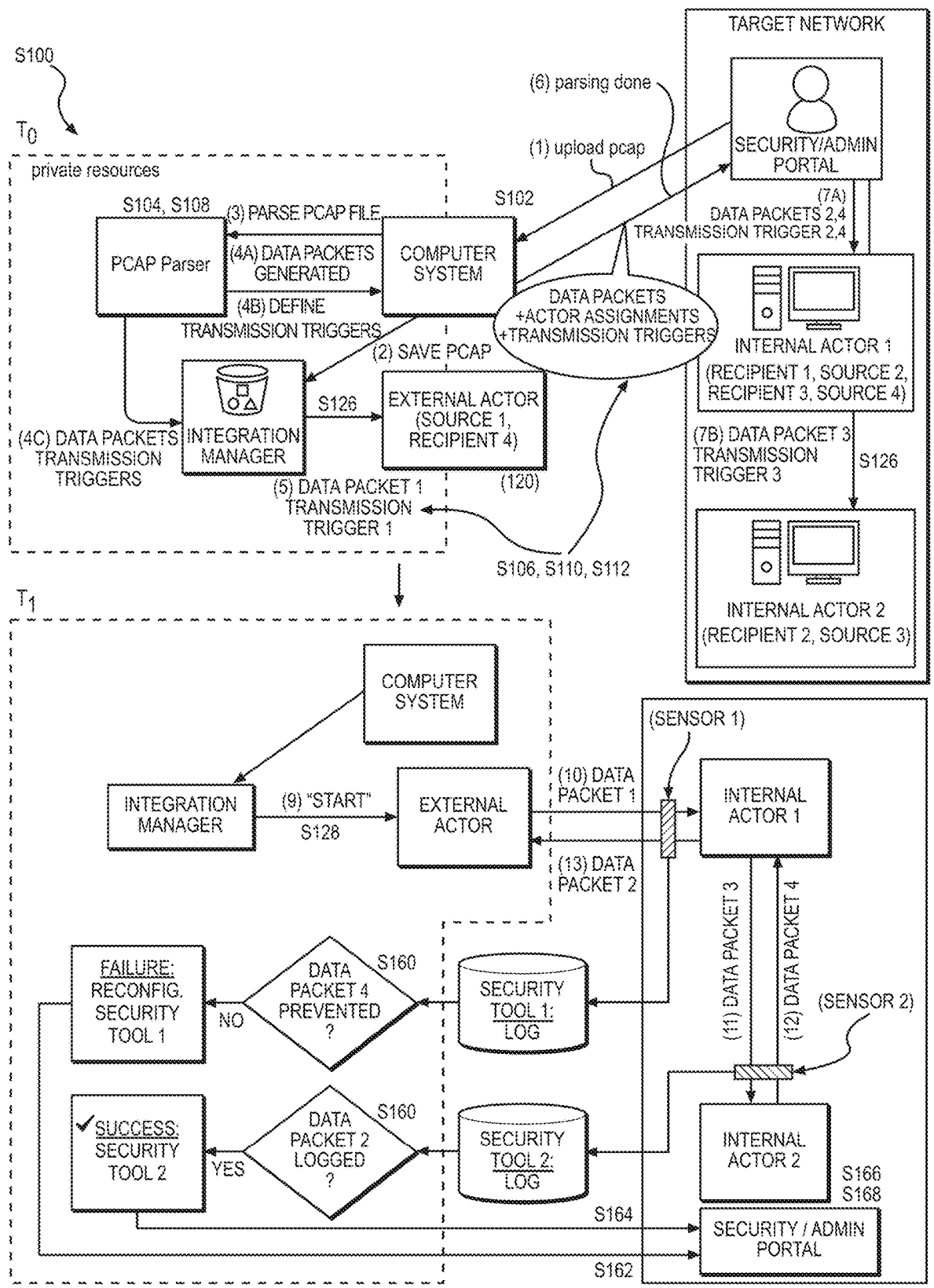
FIG. 3 is a flowchart representation of one variation of the method.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Methods

As shown in FIGS. 1, 2, 3, 4, 5, 6, 7A, 7B, and 7C, a method S100 includes: accessing a set of data packets representing data transmitted between machines in communication with a reference computer network during a malicious attack on the reference computer network during a first time period in Block S104; and selecting a set of assets as actors in an emulation of the malicious attack on a target computer network in Block S106. The set of assets includes: a first internal asset within the target computer network; and a second external asset external to the target computer network.

The method S100 includes, for each data packet in the set of data packets: assigning a behavior trigger, in a set of behavior triggers, to the data packet based on a corresponding behavior during the malicious attack on the reference computer network in Block S108; assigning a recipient asset, in the set of assets, to receive the data packet in Block S110; and assigning a source asset, in the set of assets, to transmit the data packet to the recipient asset according to the behavior trigger in Block S112.

The method S100 also includes initiating transmission of the set of data packets from source assets to recipient assets, in the set of assets, according to the set of behavior triggers to emulate the malicious attack on the target network in Block S128.

1.1 Variation: Computer-Readable Medium

As shown in FIGS. 1, 2, 3, 4, 5, 6, 7A, 7B, and 7C, a non-transitory computer-readable medium stores an executable file including instructions that, when executed by a processor of a first internal asset within a target computer network, cause the processor to access a set of data packets from the executable file, the set of data packets representing data transmitted between machines in communication with a reference computer network during a malicious attack on the reference computer network. Each data packet in the set of data packets: is associated with a behavior trigger, in a set of behavior triggers, based on a corresponding behavior during the malicious attack on the reference computer network; defines a recipient asset, in a set of assets, to receive the data packet; and defines the source asset, in the set of assets, to transmit the data packet to the recipient asset according to the behavior trigger.

The non-transitory computer-readable medium stores the executable file also including instructions that cause the processor to: initiate transmission of the first data packet from the first internal asset to the second external asset according to a first behavior trigger in the set of behavior triggers; and generate a context file specifying a set of artifacts representing indicators of the malicious attack responsive to reception of data packets in the set of data packets at the first internal asset and transmission of data packets in the set of data packets from the first internal asset.

1.2 Variation: Executable File Generation and Context File Translation

As shown in FIGS. 1, 2, 3, 4, 5, 6, 7A, 7B, and 7C, one variation of the method S100 includes: accessing a set of data packets representing data transmitted between machines in communication with a reference computer network during a malicious attack on the reference computer network during a first time period in Block S104; and selecting a set of assets as actors in an emulation of the malicious attack on a target computer network in Block S106. The set of assets includes: a first internal asset within the target computer network; and a second external asset external to the target computer network.

This variation of the method S100 also includes, for each data packet in the set of data packets: assigning a behavior trigger, in a set of behavior triggers, to the data packet based on a corresponding behavior during the malicious attack on the reference computer network in Block S108; assigning a recipient asset, in the set of assets, to receive the data packet in Block S110; and assigning a source asset, in the set of assets, to transmit the data packet to the recipient asset according to the behavior trigger in Block S112.

This variation of the method S100 further includes generating an executable file including the set of data packets, defining the set of behavior triggers, and configured to trigger the first internal asset to generate a context file specifying a first set of artifacts according to a first format in Block S120. The first set of artifacts represents indicators of the malicious attack responsive to: reception of data packets in the set of data packets at the first internal asset; transmission of data packets in the set of data packets from the first internal asset; and execution of behaviors corresponding to behavior triggers in the set of behavior triggers.

This variation of the method S100 also includes: during a second time period succeeding the first time period and in response to execution of the executable file at the first internal asset, initiating transmission of the set of data packets from source assets to recipient assets, in the set of assets, according to the set of behavior triggers to emulate the malicious attack on the target network in Block S128; accessing the context file specifying the first set of artifacts and generated by the first internal asset in response to termination of the emulation of the malicious attack on the target computer network in Block S150; transforming the first set of artifacts into a second set of artifacts according to a second format associated with a target security technology deployed on the target computer network in Block S154; and serving the second set of artifacts to the target security technology in Block S156.

2. Applications

Generally, a computer system can execute Blocks of the method S100: to configure a target asset within a target computer network to execute a predetermined set of steps that mimic or implement actions on (or communications between) machines connected to a reference network during a previous attack on the reference network; to initiate an emulation of these actions at the target asset; and to monitor security technologies installed on the target network for detection, prevention, and/or alert events in response to this emulation. The computer system can then verify whether these security technologies deployed on the target network are properly configured to respond to an authentic analogous attack on the target network based on whether these security technologies generated detection, prevention, or alert events related to these actions responsive to the emulation.

In particular, the computer system can configure the target asset based on attack profiles garnered from real-world attack tactics, techniques, and procedures (TTPs) and/or packet fragments—transmitted between machines within the reference network and representative of bandwidth and other characteristics of the reference network during a previous attack on the reference network—recombined to form a set of data packets representative of original "conversations" between these machines during the previous attack.

Accordingly, the computer system can: reconstruct an authentic attack "conversation" (or trajectory) from this previous attack on the reference network by reassembling data fragments into complete data packets; and then replay this attack "conversation" by coordinating transmission of these data packets (and execution of other behaviors) between two assets (or "actors") within and/or outside of the target network during an attack emulation.

Therefore, this attack emulation generates behaviors and network traffic on the target network that is authentic and representative of real behaviors and network traffic that might occur on the target network during such a similar real attack on the target network. Detection, prevention, and/or alerting events generated by security technologies deployed on the target network responsive to the attack emulation generally or to individual emulation actions within the attack emulation may therefore accurately predict whether these security technologies are currently configured to respond to a similar real attack on the target network.

2.1 Self-Contained Emulation Package

More specifically, the computer system can execute Blocks of the method S100: to recombine packet fragments within a PCAP file to form the set of data packets representative of original "conversations" between machines during the previous attack; to designate a set of assets—within and outside of a target network but not configured to execute commands or extract other data contained within these data packets—to send and receive these data packets during an attack emulation on the target network; and to generate an emulation schedule for transmission of these data packets between these source and destination assets.

Additionally, the computer system can execute Blocks of the method S100 to generate a deterministic attack flow incorporating known or expected attacker techniques that vary by type of target, point of vulnerability, timing, latency, and parallelism of executable steps at a single asset (e.g., synchronously or quasi-synchronously performing more than one step in the attack flow at a selected node).

Then, the computer system can execute Blocks of the method S100: to generate a self-contained attack emulation package—such as an executable file—that includes the data packets, the attack emulation schedule, and/or the deterministic attack flow (or "attack graph"); and to deploy this attack emulation package to an internal asset within the target network for execution.

Accordingly, the computer system enables an operator: to load the attack emulation package on an internal asset—that excludes an (persistent) agent installed thereon—within the target network; and, upon execution of the attack emulation package at the internal asset, to configure this internal asset to execute steps of attack emulation on the target network (in coordination with the computer system) in which designated source agents transmit assigned data packets to designated destination agents according to the emulation schedule. Therefore, the computer system can execute Blocks of the method S100 to enable verification of security technologies deployed on a broader range of internal assets (and/or target networks) by operators absent access permissions to install (or execute) an agent on the internal asset.

2.2 Context File

Furthermore, the computer system can execute Blocks of the method S100: to configure the internal asset (e.g., via the emulation package) to generate a context file specifying artifacts—representing evidence of completed (or attempted) steps of the attack emulation—according to a universal format; to translate the context file into a specific format compatible with a target security technology; and to serve the context file to the target security technology.

Accordingly, the computer system enables an operator to manually (or automatically) load the context file into a security technology—absent an integration manager connected to and enabled for the security technology (and/or the target network)—in order to verify detection, prevention, logging, and/or alerting capabilities of the target security technology to respond to a similar real attack on the target network. Therefore, the computer system can execute Blocks of the method 100: to enable the target security technology to correlate artifacts of the context file—even when the target network includes a network boundary (or an "air-gap")—with other log sources connected to the target security technology, thereby improving operational efficiency for security personnel by enabling centralized prevention and detection capabilities for existing security infrastructure and workflows while reducing manual effort in correlation tasks.

3. Terminology

Generally, a "reference network" is referred to herein as a computer network that was previously subject to a malicious attack, such as a command-and-control or data-leak attack.

Generally, a "machine" is referred to herein as a computing device—such as a server, a router, a printer, a desktop computer, or a smartphone—within or connected to the reference network and that was involved in the malicious attack.

An "attack record" is referred to herein as a data file, investigation report, or other description of techniques, procedures, and artifacts of actions performed at a machine during the previous attack. For example, an application programming interface installed on or interfacing with the reference network can capture packet fragments transmitted between machines internal and external to the reference network and related metadata during the previous attack. The application programming interface can also capture metadata representative of these packet fragments, such as including: transmit times (or "timestamps"); source machine identifiers (e.g., IP or MAC addresses); destination machine identifiers; protocols (e.g., TCP, HTTP); packet payloads (or "lengths"); source and destination ports; request types (e.g., file requests, connection initiation and termination requests); and/or request response types (e.g., requests confirmed, requests denied, files sent). A security analyst or computer system can then: filter these packet fragments to remove packet fragments not related (or unlikely to be related) to the previous attack; interpret a sequence of actions executed by a machine during the previous attack based on the remaining packet fragments and metadata; and derive techniques, procedures, and artifacts of these actions from these packet fragments and metadata.

Generally, a "packet capture file" (hereinafter a "PCAP file") is referred to herein as a data file containing packet fragments interchanged between two machines—such as between two machines inside the reference network or between one machine internal to the reference computer network and a second machine outside of the reference network—during the malicious attack on the reference network.

A "target network" is referred to herein as a computer network on which the previous attack is emulated by a target asset attempting behaviors prescribed in nodes of an attack graph and/or by "replaying" the PCAP file—according to Blocks of the second method S100—in order to detect vulnerabilities to the previous attack on the target network and thus verify that security technologies deployed on the target network are configured to respond to (e.g., detect, prevent, or alert on) analogous attacks.

An "asset" is referred to herein as a computing device—such as a server, a router, a printer, a desktop computer, a smartphone, or other endpoint device—within or connected to the target computer network.

Generally, an "internal asset" is referred to herein as an asset—within the target network—loaded with attack emulation software and thus configured to execute steps of attack emulations on the target network. Similarly, an "external asset" is referred to herein as an asset—external to the target network (e.g., a remote server)—loaded with attack emulation software and thus configured to execute steps of attack emulation on the target network.

Generally, an "actor" is referred to herein as an internal or external asset selected—such as automatically by the computer system or manually by security personnel—to execute a step of a particular attack emulation on the target network, such as by transmitting a data packet to another actor or receiving a data packet from another actor.

Generally, an "attack emulation" is referred to herein as attempted execution of an attack graph by an asset within or connected to the target computer network and/or a coordinated, time- or action-based interchange of data packets, derived from the PCAP file, between actors within and external to the target network to emulate the malicious attack—that previously occurred on the reference network—on the target network.

Generally, an "emulation action" is referred to herein as a step or "stage" of an attack emulation in which a data packet is transferred from a source agent to a recipient agent according to a time- or action-based trigger derived from the PCAP file.

Generally, an "executable file" is referred to herein as a package including data and instructions that, when executed by an asset (e.g., an asset within a target computer network), configures the asset to execute steps of attack emulations on the target network.

Generally, a "network boundary" is referred to herein as a physical and/or logical separation of a target network, such as a mechanism(s)—installed on the target network—that controls flow of network communication into and/or out of the target network. For example, a target network exhibiting a network boundary (or an "air-gapped network") can: include internal assets within the target network; permit network communication between these internal assets within the network boundary of the target network; and prevent network communication—across the network boundary—between internal assets and external assets outside of the target network and/or the network boundary.

4. System

As shown in FIGS. 1, 3, 5, and 6, the computer system can include or interface with: an internal asset(s) (or a "target asset") within the target network; an external asset(s) outside of the target network; and an integration manager.

For example, the computer system can include a pool of external assets outside of the target network. Each external asset in the pool of external assets can include an external agent installed thereon. However, in this example, the internal asset excludes an internal agent—loaded with attack emulation software and thus configured to execute steps of attack emulations on the target network—installed thereon.

In one implementation, the computer system can execute Blocks of the method S100 to define, configure, schedule, and coordinate emulation actions within the attack emulation on the target network.

4.1 External Asset

Generally, the computer system coordinates execution of emulation actions by external assets outside of the target network during the attack emulation.

In one implementation, the computer system includes an external asset (e.g., an external server): outside of the target network; loaded with the attack emulation software; and configured to emulate a malicious external actor during a network attack.

4.2 Internal Asset

The computer system also coordinates execution of emulation actions by internal assets within the target network during the attack emulation.

In one implementation, the computer system includes or interfaces with an internal asset (e.g., an internal server, a printer, a desktop computer, a smartphone, a router, a network switch): within the target network; and loaded with an attack emulation software configured to send and receive data packets according to emulation actions within an attack emulation generated by the computer system.

In one example, an internal asset: loads a data packet generated from a set of packet fragments extracted from the PCAP file and corresponding to a emulation action; detects or receives a trigger, such as receipt of a command from the integration manager, receipt of a data packet from another internal or external asset, or expiration of an internal timer; and then transfers the data packet—such as in its entirety or over a sequence of packet fragments based on real-time traffic, bandwidth, and configuration of the target network—to a designated destination asset within or external to the target network according to the emulation schedule.

In another example, an internal asset: loads an attack graph; selects a first node in the attack graph; selects a first (e.g., a highest-ranking) behavior in the first node; attempts completion of the first behavior; and transitions to a second node in the attack graph responsive to successful completion of the first behavior or select and repeat this process for a second behavior in the attack graph. The internal asset can then repeat this process for subsequent nodes of the attack graph until: the internal asset fails to complete all behaviors within one node; or completes a behavior in the last node in the attack graph to complete the attack graph.

4.3 Integration Manager

In one implementation, when the method S100 is enabled on the target network, an administrator or other affiliate of the target network: installs an instance of an integration manager on a machine within the target network; and supplies login information or other credentials for security technologies (e.g., direct and aggregate network threat management systems) installed or enabled across the target network or at particular assets within the target network. The integration manager can then: load plugins for these security technologies; automatically enter login information or other credentials supplied by the administrator in order to gain access to event logs generated by these security technologies responsive to activity detected on the target network; and retrieve current settings and configurations of these security technologies within the target network, such as whether these security technologies are active and whether active security technologies are configured to detect, prevent, or alert on certain network activities or attacks more generally.

5. Attack Record

Block S102 of the method S100 recites accessing an attack record defining a sequence of actions executed on a machine within the reference computer network during the malicious attack on the reference computer network.

Generally, in Block S102, the computer system can access an attack record generated in real-time during an attack and/or post hoc during an investigation of the attack on the reference network.

In one implementation, the computer system accesses the attack record generated according to full packet capture (or "FPC") techniques executing on the reference network during the attack. Thus, in this implementation, the computer system can access an attack record (e.g., a PCAP file) that includes a population of packet fragments that represent packet interchanges between hosts (e.g., "machines") within and external to the reference network during the previous attack on the reference network at an earlier time.

For example, an attack on the reference network may generate network traffic between machines inside of the reference network and a machine outside of the reference network (e.g., a malicious external actor). An attack record generated during this attack may thus contain actual packet fragments transmitted between these internal machines and the external machine during the attack. The attack record may also contain metadata representative of each packet fragment, such as including: a transmit time (or "timestamp"); a source machine identifier (e.g., an IP or MAC address); a destination machine identifier (e.g., an IP or MAC address); a protocol (e.g., TCP, HTTP); a packet payload (or "length"); source and destination ports; a request type (e.g., file requests, connection initiation and termination requests); and/or a request response type (e.g., request confirmed, request denied, file sent).

Thus, in this implementation, the attack record may include a set of packet fragments that together represent a single data packet—sent from a source machine to a destination machine during the attack on the reference network—containing a command, a request, or a file. The payload (i.e., the size, the length) of an individual packet fragment represented in the attack record may be a function of real-time network traffic, network bandwidth, and/or network configuration, etc. at the reference network when the corresponding source machine transmitted the packet fragment to a corresponding destination machine. Therefore, transmission of this data packet within, to, or out of the reference network at a particular time during the attack may be unique to the reference network at this particular time.

Additionally or alternatively, after the attack is detected on the reference network and characterized, such as by an external security technology, the computer system (or a supplier of the attack record) can: estimate a time period of the attack on the reference network; access a global attack record representing traffic on the reference network over time; extract a subset of packet fragments associated with timestamps that intersect the time period of the attack; filter this subset of packet fragments by source and destination machines that were and/or that may have been involved in the attack; and aggregate these packet fragments and related metadata in an attack record for the attack. The computer system can then retrieve this attack record in Block S102.

Additionally or alternatively, after the attack is detected on the reference network and characterized, such as by an external security technology, the computer system (or a supplier of the attack record) can: investigate actions performed by a particular machine on the reference network as part of the attack, such as both failure and successful actions performed by the particular machine under the control of a remote attacker; characterize the techniques, procedures, and artifacts of these actions; and store the techniques, procedures, and artifacts of these actions in an attack record of the attack.

For example, the computer system (or a supplier of the attack record) can categorize command and control techniques of an action by the particular machine during the attack on the reference network as one of: an application layer protocol; communication through removable media; data encoding, data obfuscation; data resolution; an encrypted channel; a fallback channel; an ingress tool transfer; a multi-state channel; a non-application layer protocol; protocol tunneling; a proxy; remote access software; traffic signaling; and a web service; etc. In this example, the computer system (or a supplier of the attack record) can similarly categorize lateral movement techniques of an action by the particular machine during the attack on the reference network as one of: exploitation of remote services; internal spear phishing; lateral tool transfer; remote service session hijacking; relocation through removable media; and use of alternate authentication material; etc. In this example, the computer system (or a supplier of the attack record) can further categorize a procedure of a remote service session hijacking lateral movement technique of an action by the particular machine during the attack on the reference network as one of a SSH hijacking, RDU hijacking, remote desktop protocol, an SMW administrator share, or a distributed component object model procedure. Similarly, in this example, the computer system (or a supplier of the attack record) can further categorize a procedure of an alternate authentication material lateral movement technique of an action by the particular machine during the attack on the reference network as one of a pass the hash, pass the ticket, application access token, and web session cookie procedure.

Furthermore, the computer system (or a supplier of the attack record) can derive and store artifacts of each action in the attack record, such as including: duration of the action; success of the action; quantity of attempts of the action; user or authentication credentials carried forward from a successful previous action of the attack; and port states and state changes during the action; etc.

Therefore, the attack record can include threat intelligence for a previous attack on the reference network, including a sequence of actions—defined by techniques, behaviors, and artifacts—executed by the machine as part of the attack. However, the computer system can generate or access the attack record in any other way and containing attack data in any other format.

5.1 Data Packet Reconstruction

Block S104 of the method S100 recites accessing a set of data packets representing data transmitted between machines in communication with a reference computer network during a malicious attack on the reference computer network during a first time period.

Generally, in Block S104, the computer system can recombine packet fragments contained within the PCAP file to generate a sequence of complete, discrete data packets that were transferred between machines—internal and external to the reference network—during the attack on the reference network. In particular, the computer system can group discrete packet fragments by: source machine identifiers; destination machine identifiers; timestamp; packet payload; protocol; source and destination ports; request type; and/or request response type; etc. The computer system can then compile groups of discrete packet fragments into complete data packets.

In one example, the computer system extracts a corpus of packet fragments with metadata from the PCAP files and identifies a set of unique IP addresses represented in this corpus of packet fragments. The computer system then: selects a first group of packet fragments in the PCAP file that designate a first IP address—in this set of unique IP addresses—as a source; and segments the first group of packet fragments into a first set of packet fragment subgroups, wherein each packet fragment subgroup designates one other IP address as a destination. The computer system then: selects a first packet fragment subgroup—in this first set of packet fragment subgroups—designating a first destination IP address; and segments the first packet fragment subgroup into a first set of contiguous packet fragment clusters, wherein each packet fragment cluster contains packet fragments designating the same protocol, the same source and destination ports, the same request type, and/or the same request response type. Then, for a first packet fragment cluster in this first set of contiguous packet fragment clusters, the computer system: retrieves packet fragments in this first packet fragment cluster; sorts these packet fragments by timestamp; extracts data from these packet fragments; reassembles these packet fragments into a first data packet according to their timestamps; and labels the first data packet with a first time of the earliest timestamp of packet fragments in this first packet fragment cluster, the first source IP address, and the first destination IP address.

In this example, the computer system then repeats this process for each other packet fragment cluster in this first set of contiguous packet fragment clusters to generate a first cluster of data packets, each labeled with: a time of the earliest timestamp of packet fragments in its corresponding packet fragment cluster; the first source IP address; and a destination IP address. The computer system further repeats this process for each other packet fragment subgroup in the first set of packet fragment subgroups to generate a subgroup of data packets, each labeled with: a time of the earliest timestamp of packet fragments in its corresponding packet fragment cluster; a source IP address of its corresponding packet fragment cluster; and a destination IP address of its corresponding packet fragment cluster. The computer system further repeats this process for each other group of packet fragments to generate a corpus of data packets, wherein each data packet is labeled with: a time of the earliest timestamp of packet fragments in its corresponding packet fragment cluster; a source IP address of its corresponding packet fragment cluster; and a destination IP address of its corresponding packet fragment cluster.

The computer system can therefore group packet fragments—in the population of packet fragments extracted from the PCAP file—into a set of packet fragment clusters based on congruent addresses of source machines, congruent addresses of destination machines, and continuity of timestamps associated with packet fragments in this population of packet fragments. For each cluster of packet fragments in the set, the computer system can then: define an order of packet fragments in the cluster of packet fragments based on timestamps of packet fragments in the cluster of packet fragments; and recombine the cluster of packet fragments into a singular packet fragment based on this order.

More specifically, the computer system can: cluster packet fragments by packet fragment metadata stored in the PCAP file; and then compile data—extracted from one contiguous cluster of packet fragments—into one data packet labeled with a (relative or absolute) time that the packet fragment was transmitted from a particular source machine to a particular destination machine on the reference network, an identifier of the particular source machine, and an identifier of the particular destination machine. This corpus of data packets may therefore represent multiple concurrent and/or serial "conversations"—normalized for network traffic, bandwidth, and configuration—between machines within and external to any network during an analogous attack.

6. Asset Selection

Block S106 of the method S100 recites selecting a set of assets as actors in an emulation of the malicious attack on a target computer network, the set of assets including: a first internal asset within the target computer network; and a second external asset external to the target computer network.

Generally, in Block S106, the computer system can assign (or designate, select) internal and external assets as actors to emulate the malicious attack on the target network.

In one implementation, the computer system can automatically designate a first internal asset for the emulation.

In another implementation, the computer system can identify quantities of unique external machines represented in the PCAP file and/or the attack graph and then assign this quantity of external assets, in the pool of external assets and outside of the target network, to the attack emulation.

In another implementation, the computer system can identify a set of external machines—external to the reference network—involved in the malicious attack on the reference network based on unique addresses (e.g., IP addresses) of source machines and destination machines associated with packet fragments represented in the PCAP file. The computer system can then derive a set of characteristics of a first external machine in this set from packet fragments and metadata in the PCAP file, such as: a transmit port; a receive port; an operating system; a machine type; file types of data stored in local memory; or network access permissions. The computer system can then select an external asset—from the pool of external assets external to the target network—that exhibits characteristics analogous (e.g., identical, similar, or nearest) to the set of characteristics of the first external machine. For example, the computer system can weight characteristics of the first external machine in order of: transmit and receive port; machine type; operating system; network access permissions; and finally local memory file types. The computer system can then score each external asset 120 in the pool of external assets according to similarity to characteristics of the first external machine, adjusted by weight of these characteristics. The computer system can repeat this process for each other external machine in the set to derive characteristics of these other external machines and then score external assets in the pool of external assets 120 by similarity to characteristics of each of the external machines. Finally, the computer system can select: a combination of external assets—including one external asset per external machine represented in the PCAP file—that maximizes the aggregate score of this combination of external assets; link each external asset in this combination to a corresponding external machine represented in the PCAP file; and designate each of these external assets as actors to emulate its corresponding external machine during the attack emulation on the target network.

Alternatively, the computer system can automatically designate a dedicated external asset—external to the target network—for the emulation.

6.1 Address Replacement

The method S100 includes, for each data packet in the set of data packets: assigning a recipient asset, in the set of assets, to receive the data packet in Block S110; and assigning a source asset, in the set of assets, to transmit the data packet to the recipient asset according to the behavior trigger in Block S112.

Generally, in Blocks S110 and S112, the computer system can replace addresses (e.g., IP addresses)—representative of machines involved in the malicious attack on the reference network—contained in the set of data packets with addresses of assets designated and available for attack emulation.

In one implementation, the computer system scans the set of unique IP addresses represented in the PCAP file for: a first group of internal IP addresses of machines inside of the reference network; and a second group of external IP addresses of machines external to the reference network. Then, for a first internal IP address in the first group, the computer system: associates the first internal IP address with a first internal asset inside of the target network; and overwrites each source and destination IP address—in the set of data packets—specifying this first internal IP address with the IP address of the first internal asset. Similarly, for a second internal IP address in the first group, the computer system: associates the second internal IP address with a second internal asset inside of the target network; and overwrites each source and destination IP address—in the corpus of data packets—specifying this second internal IP address with the IP address of the second internal asset. The computer system repeats this process for each other internal IP address in the first group.

Similarly, for a first external IP address in the second group, the computer system: associates the external IP address with a second external asset 120 (or a second external agent) outside of the target network; and overwrites each source and destination IP address—in the set of data packets—specifying this first external IP address with the IP address of the second external asset. The computer system repeats this process for each other external IP address in the second group.

In one example, for a first data packet designating (or specifying) a first source IP address associated with an internal machine within the reference computer network and a first destination IP address associated with an external machine outside of the reference computer network, the computer system: selects an external asset 120 as a recipient asset to receive the first data packet; selects the first internal asset as a source asset to transmit the first data packet to the external asset; replaces the first source IP address, designated in the first data packet, with the IP address of the first internal asset; and replaces the first destination IP address, designated in the first data packet, with the IP address of the external asset.

In another example, for a second data packet designating a second source IP address associated with the external machine outside of the reference computer network and a second destination IP address associated with the internal machine within the reference computer network, the computer system: selects the first internal asset as a recipient asset to receive the second data packet; selects the external asset as a source asset to transmit the second data packet to the first internal asset; replaces the second source IP address, designated in the second data packet, with the IP address of the external asset; and replaces the second destination IP address, designated in the second data packet, with the IP address of the first internal asset.

Therefore, the computer system can replace IP addresses—representative of machines within and connected to the reference network during the previous attack—contained in the corpus of data packets with IP addresses of assets—within and connected to the target network—available for attack emulation.

7. Attack Emulation Triggers

Block S110 of the method S100 recites, for each data packet in the set of data packets, assigning a behavior trigger, in a set of behavior triggers, to the data packet based on a corresponding behavior during the malicious attack on the reference computer network.

Generally, in Block S110, the computer system can generate a schedule (or a set of time- or action-based triggers) for transmission of the set of data packets between these internal and external assets.

7.1 Time-Based Triggers

In one implementation, the computer system: sorts the set of data packets by timestamp; calculates relative time offsets between consecutive data packets in the attack emulation based on these timestamps; and generates a schedule containing a sequence of relative timers based on these relative time offsets.

In another implementation, the computer system: sorts the set of data packets by timestamp; calculates absolute time offsets from the first data packet in the attack emulation to each other data packet in the attack emulation based on these timestamps; and generates a schedule containing a set of absolute timers based on these absolute time offsets.

For example, the computer system can: define a first absolute time offset between a first data packet, in the set of data packets, and an emulation start time triggered by the integration manager; assign a first transmit time to the first data packet succeeding the emulation start time by the first absolute time offset; define a second absolute time offset between a second data packet, in the set of data packets, and the start time; and assign a second transmit time, succeeding the start time by the second time offset, to the second data packet. Therefore, in this example, when the computer system initiates the attack emulation (e.g., based on a start command indicating the emulation start time), source assets can transmit data packets to designated destination assets when based on these transmit times. More specifically, the first internal asset—assigned as a source asset to transmit the second data packet to the second external asset—can: generate a first timer—defining a duration equal to the second absolute time offset—for transmission of the second data packet; initiate the first timer in response to the start command indicating the emulation start time; and transmit the second data packet to the second external asset responsive to expiration of the first timer.

7.2 Action-Based Triggers

Additionally or alternatively, the computer system can define action-based triggers for transmission of data packets between source and destination assets during the attack emulation.

In one implementation, the computer system: accesses the set of data packets representing behaviors of machines in communication with the reference computer network during the malicious attack on the reference computer network; and, for each data packet in the set of data packets, assigns a behavior trigger, in a set of behavior triggers, to the data packet based on a corresponding behavior during the malicious attack on the reference computer network.

For example, the computer system can interpret a sequence of behaviors on the reference network from the PCAP file, including: transmission of a command (a first data packet) by a first machine to a second machine at a first time; transmission of a command (a second data packet) by the second machine to a third machine at a second time; transmission of a file (a third data packet) by the third machine to the first machine at a third time; and transmission of a response (a fourth data packet) by the third machine to the second machine at a fourth time. In this example, the computer system can derive a set of action-based triggers from this sequence of behaviors, including: transmission of the first data packet by a first asset to a second asset at a start time triggered by the integration manager; transmission of the second data packet by the second asset to a third asset in response to receiving the first data packet; transmission of the third data packet by the third asset to the first asset in response to receiving the second data packet; and transmission of the fourth data packet by the third asset to the second asset in response to transmitting the third data packet to the first asset. The computer system can this write these action-based triggers to their corresponding data packets.

7.3 Digital Signature

In one variation, the computer system digitally signs each data packet in the attack emulation, such as to prevent tampering and/or to key a data packet to an action-based trigger for executing a next emulation action.

More specifically, the computer system can sign each data packet in the attack emulation with a digital private certificate, such as with Public Key Infrastructure, prior to deploying the attack emulation to the target network. In this example and as described below, upon receiving a signed data packet during the attack emulation, an agent can: read the signature on the data packet; identify the data packet as an action within the attack emulation; initiate a next emulation action (e.g., transmit a next data packet to another agent) succeeding receipt of the data packet according to the emulation schedule; and then discard the data packet without reading or executing commands with the data packet.

7.4 Emulation Action

The computer system can combine a data packet with a source asset, a destination asset, and a time- or action-based trigger to define an "emulation action" within the attack emulation. The computer system can also associate this emulation action with a protocol, a packet payload, source and destination ports, a request type, and/or request response type, etc. derived from the cluster of packet fragments—characteristic of this data packet—contained in the PCAP file. The computer system can further associate this emulation action with a target response type (e.g., detection, logging, prevention, alerting) by one or more security technologies deployed on the target network.

The computer system can therefore: generate a set of emulation actions that, when executed by source assets—within and external to the target network—emulate behaviors representative of the previous attack on the reference network; and define characteristics for verifying responses to these behaviors by security technologies deployed on the target network.

8. Attack Graph Construction

The method S100 recites: generating an attack graph including a set of nodes connected according to the sequence of actions, each node in the set of nodes: corresponding to an action in the sequence of actions in Block S114; and storing a set of behaviors analogous to the action and executable by a target asset to emulate an effect of the action on the machine in the reference computer network in Block S116.

Figure 6:
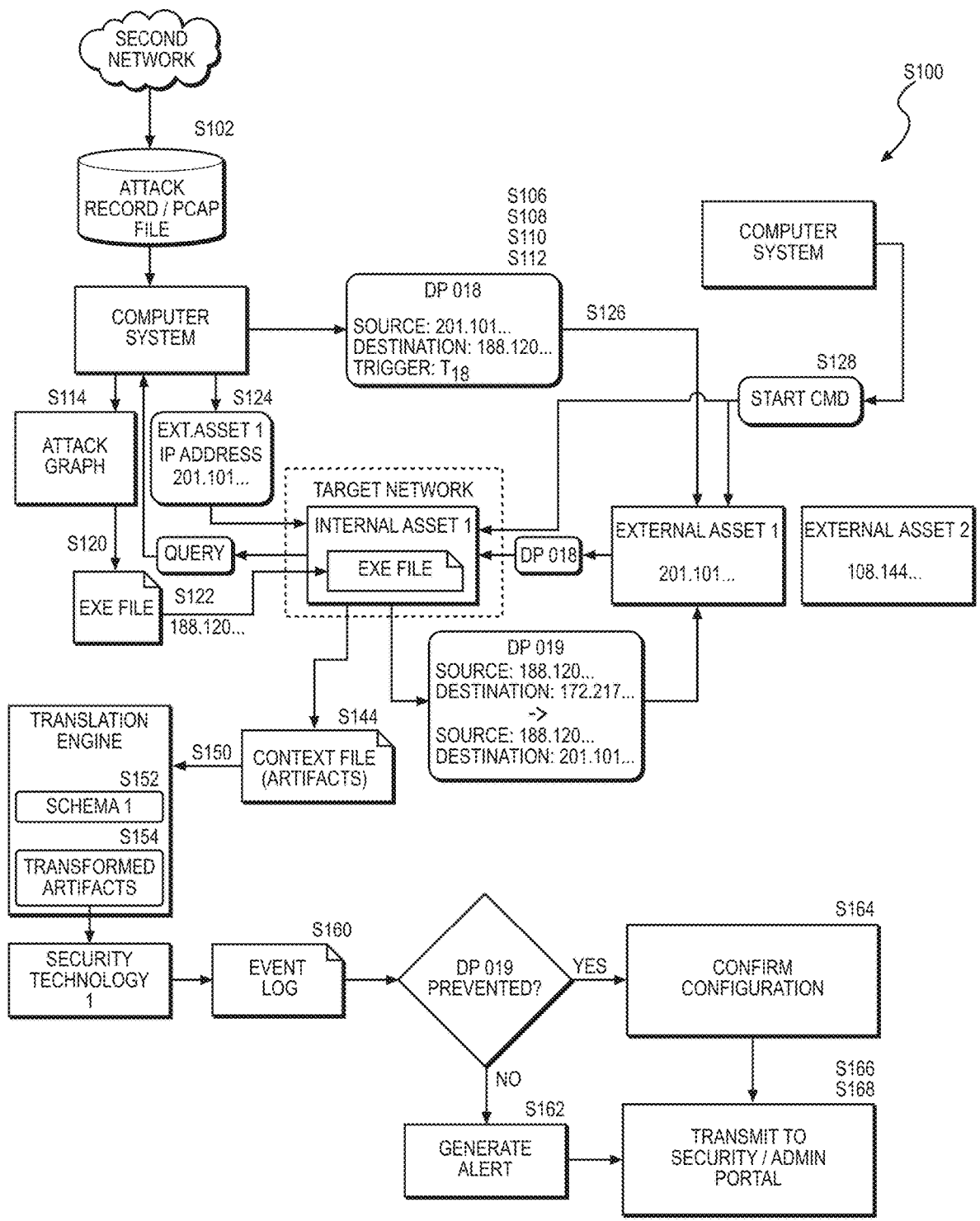
FIG. 6 is a flowchart representation of one variation of the method.
Figure 7A:
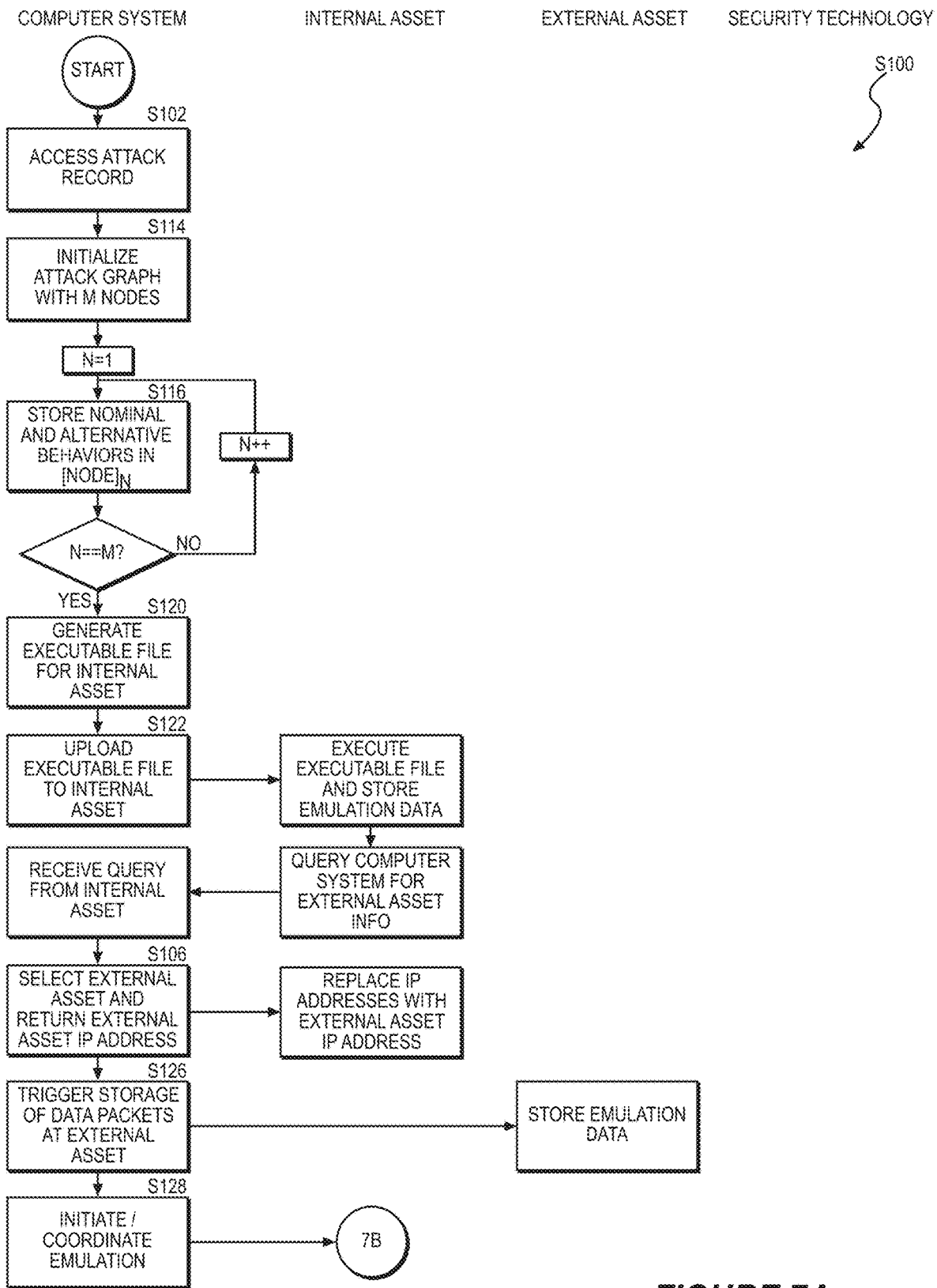
FIGS. 7A, 7B, and 7C are flowchart representations of one variation of the method.
Figure 7B:
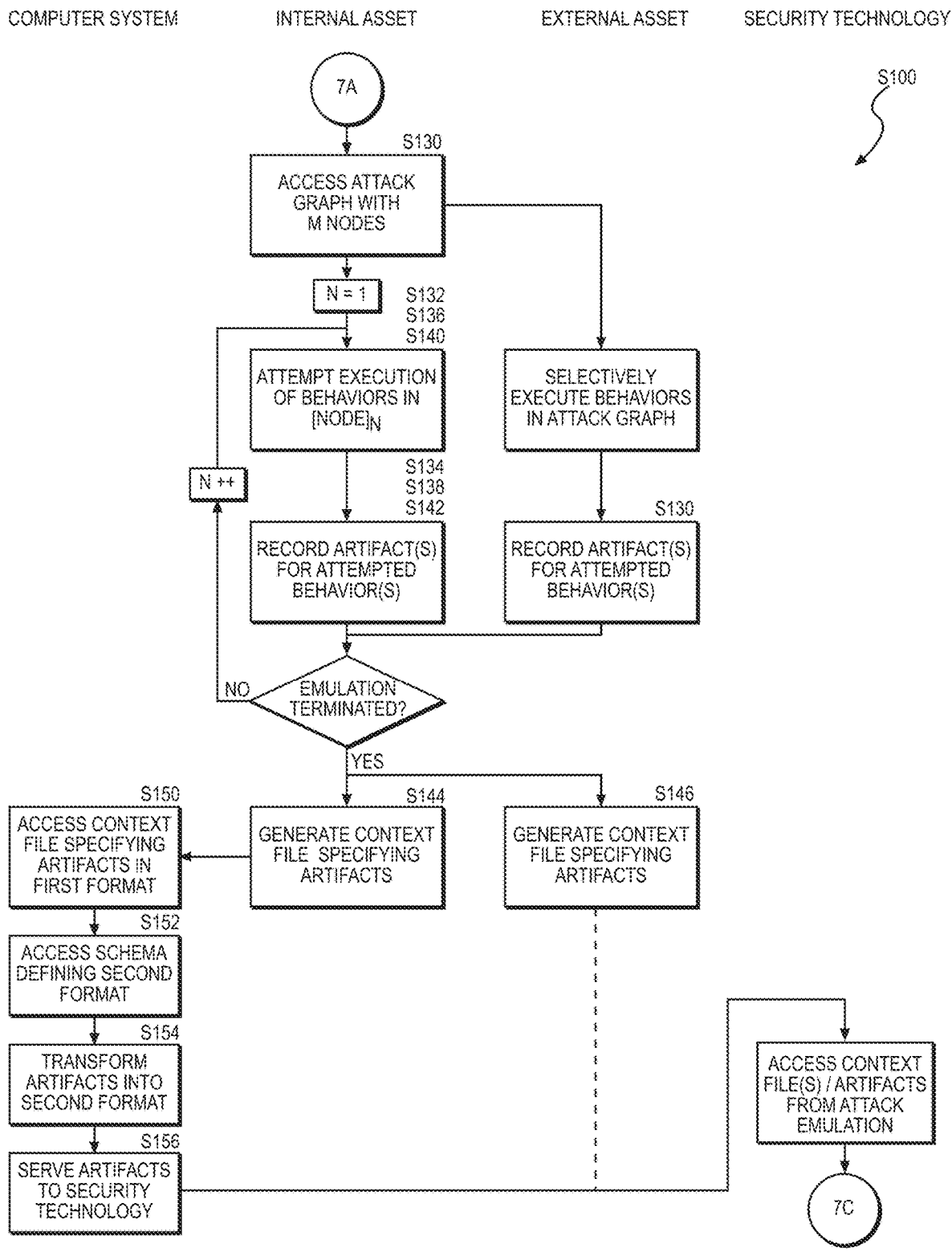
Figure 7C:
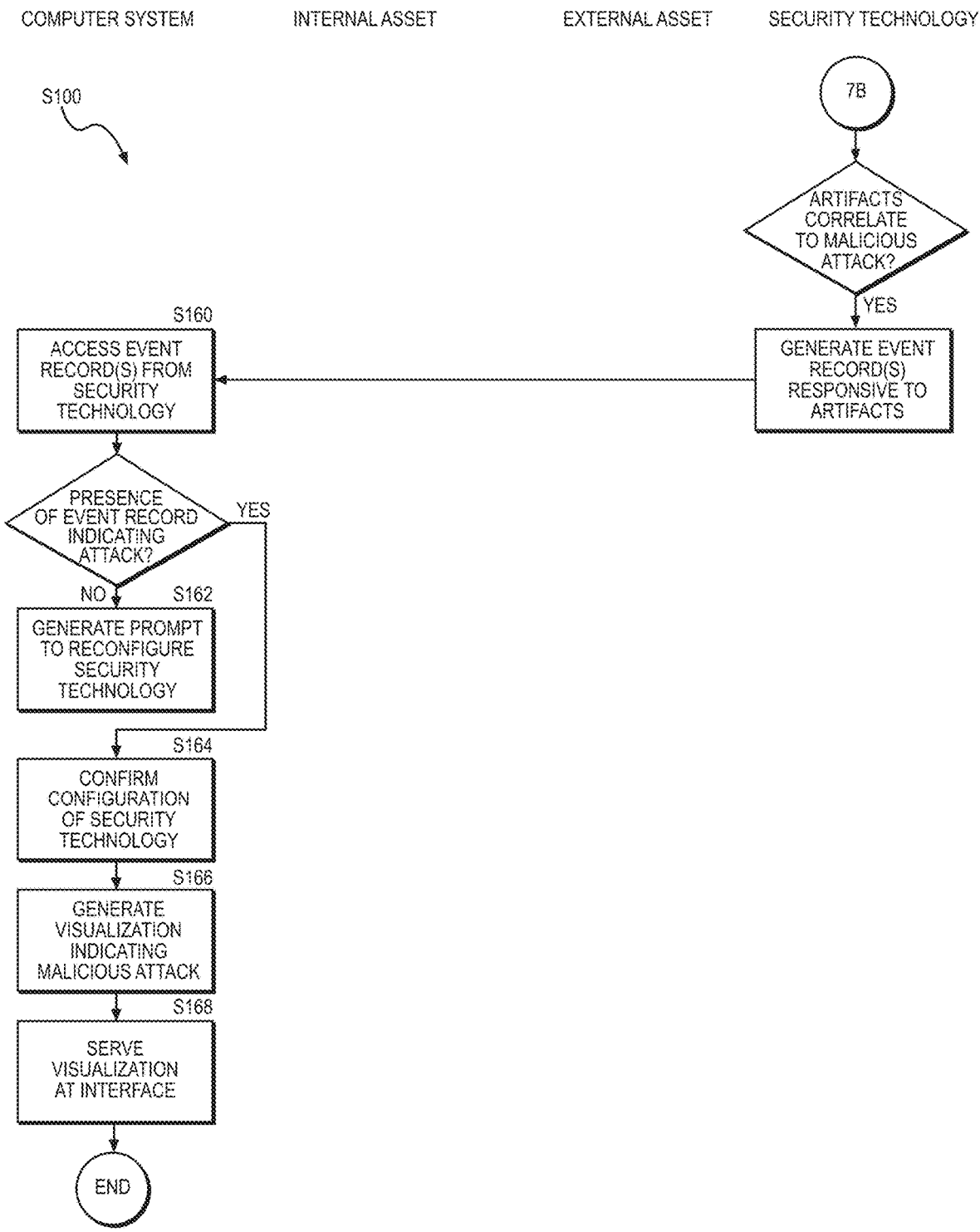

Once the computer system accesses the attack record representing actions by the machine during the previous attack, the computer system can: initialize an attack graph including a set of nodes in Block S114; and populate each node in the attack graph with a set of behaviors that replicate and/or are analogous (e.g., in result) to actions executed on the machine on the reference network during the previous attack in Block S116, as shown in FIG. 6.

8.1 Analogous Behaviors

In one implementation, for a first action in the sequence of actions that represent the previous attack, the computer system can: derive a start condition at the machine prior to start of the first action based on the attack record; derive an end condition at the machine following completion of the first action based on the attack record; and define a first nominal behavior representing the first action executed by the machine during the previous attack and executable by a target asset on the target network to emulate the first action. For the first action, the computer system can also define a set of alternative (or "analogous") behaviors: analogous to the nominal behavior; and executable by the target asset to emulate a transition from the start condition to the end condition at the target asset. The computer system can further: define a target hierarchy for the nominal behavior and the set of alternative behaviors; and store the nominal behavior and the set of alternative behaviors according to the target hierarchy in a first node in the attack graph.

In another implementation, the computer system: extracts a first technique and first procedure of the first action from the attack record; retrieves a stored, predefined behavior template for this first technique and first procedure; populates this predefined behavior template with artifacts and other characteristics of the first action extracted from the attack record to define the first nominal behavior; and compiles this behavior template into a first script for a nominal behavior for the first node of the attack graph. For example, the computer system can write a delay time following completion of a preceding action, a port selection, credential handling, and/or other artifacts from the first action in the attack record to the nominal and alternate behaviors associated with the first action.

In particular, in this implementation, the computer system can maintain a library of predefined behavior templates, each representing a different combination of technique, procedure, start condition, and end condition. For example, these predefined behavior templates can be generated by security personnel in the form of generic scripts configured to load artifacts from the attack record (or mock artifacts based on the attack record) to produce custom scripts executable by target assets to emulate actions performed on another machine during previous known attacks. Thus, in this implementation, the computer system can: retrieve predefined behavior templates configured to produce transitions nearest the first action; insert artifacts of the first action from the attack record (or mock artifacts representative of authentic artifacts from the first action, such as locations of to mock data rather than authentic sensitive data) into these predefined behavior templates; and store the resulting scripts as nominal and alternate behaviors for the first action.

In a similar implementation, the computer system: accesses a corpus of scripts previously executed by a population of machines during known attacks and/or emulated attacks and labeled with known techniques, procedures, artifacts, start conditions, and end conditions; scans the corpus of scripts for a subset of scripts labeled with start conditions, end conditions, and/or artifacts nearest the first action; and replaces or inserts authentic and/or mock data based on the attack record to generate a set of scripts for a set of nominal and alternate behaviors executable by the target asset to emulate the first action of the previous attack. For example, the computer system can: implement regression, nearest neighbor, and/or other techniques to characterize similarity scores between the first action and scripts in the corpus of scripts; select highest-scoring scripts and/or a subset of scripts that exceed a minimum similarity score; and configure these scripts to define nominal and alternate behaviors for the first action.

8.1.1 Artifacts

In one implementation, the computer system executes the foregoing methods and techniques: to retrieve predefined behavior templates configured to produce transitions nearest the first action; to insert artifacts of the first action from the attack record into these predefined behavior templates; and to store the resulting scripts as nominal and alternate behaviors for the first action.

In this implementation, the computer system generates a script representing a behavior (e.g., a nominal behavior, an analogous behavior) for the first action and executable by a target asset: to emulate the first action of the previous attack; and to trigger the target asset to record (e.g., in a log) an artifact(s) of the first action in response to execution (or attempted execution) of the behavior.

For example, the computer system can generate the script executable by the target asset to trigger the target asset to record the artifact(s) including (or representing): a hash value (e.g., a hash value of a program, a hash value of a data file) corresponding to the behavior executed by the target asset; a connection between the target asset (e.g., first internal asset) and an address (e.g., an IP address) of another asset (e.g., the second external asset); a connection between the target asset and a domain (e.g., a domain name, a domain address); a modification of a registry key at the target asset; a uniform resource identifier pattern; command and control information embedded in a network protocol; Simple Mail Transfer Protocol mailer values; an indication of a tool (or utility) associated with the behavior, such as a utility that generates malicious documents for spear phishing or a software backdoor to establish command and control; etc.

8.2 Behavior Hierarchy

The computer system can then assign a hierarchy (e.g., a rank, an order) to the nominal and alternate behaviors in the first node. For example, the computer system can define a hierarchy that assigns highest to priority to behaviors most similar to (e.g., with greatest similarity scores for) the first action the known attack, to behaviors requiring fewest or simplest steps, or to behaviors typically attempted first by attackers. The computer system can write this hierarchy to the first node.

In one implementation, the computer system: defines a first nominal behavior prescribing a first nominal technique and a nominal first procedure of the first action that produced a first end condition at the machine during the known attack; generates a first nominal script executable by the target asset to emulate the first action according to the first nominal technique and the first nominal procedure prescribed by the first nominal behavior; defines a second alternative behavior prescribing the first nominal technique and a second procedure different from the first nominal procedure; and generates a second alternative script executable by the target asset to emulate transition to the first end condition according to the first nominal technique and the second alternative procedure prescribed by the second alternative behavior.

In this implementation, the computer system can also: define a third alternative behavior prescribing the first nominal technique and a third procedure different from the nominal procedure; generate a third alternative script executable by the target asset to emulate transition to the first end condition according to the first nominal technique and the third alternative procedure prescribed by the third alternative behavior; and define a first target hierarchy specifying a) attempted execution of the first script by the target asset, b) attempted execution of the second alternative script by the target asset responsive to failed execution of the first script, and c) attempted execution of the third alternative script by the target asset responsive to failed execution of the second script. Accordingly, when executing the attack graph at a later time, the target asset can: select the first node, in the set of nodes, in the attack graph; execute the first nominal script, corresponding to the first nominal behavior, at a first time in the first time period according to the first target hierarchy; execute the second alternative script, corresponding to the second alternative behavior, at a second time succeeding the first time according to the first target hierarchy in response to detecting prevention of the first nominal script; and execute the third alternative script, corresponding to the third alternative behavior, at a third time succeeding the second time according to the first target hierarchy in response to detecting failed execution of the second alternative script. Then, in response to completion of the third alternative script, the target asset can: select a next node linked to the first node in the attack graph; and execute a second nominal script corresponding to a second nominal behavior stored in the second node.

Additionally or alternatively in the foregoing implementation, the computer system can: define a third alternative behavior prescribing a second alternative technique different from the first nominal technique; generate a third alternative script executable by the target asset to emulate transition to the first end condition according to the second alternative technique prescribed by the third alternative behavior; and define a first target hierarchy specifying a) attempted execution of the first script by the target asset, b) attempted execution of the second alternative script by the target asset responsive to failed execution of the first script, and c) attempted execution of the third alternative script by the target asset responsive to failed execution of the second script. When executing the attack graph at a later time, the target asset can selectively execute the behaviors in the first node according to this hierarchy.

Therefore, the computer system can define a hierarchy of nominal and alternate behaviors within the first node such that the target asset: attempts a first behavior in the first node; moves to the second node if the first behavior completes successfully; attempts a second behavior in the first node if the first behavior fails to complete; moves to the second node if the second behavior completes successfully; and repeats this process until the target asset either completes a behavior in the first node or attempts all behaviors in the first node.

8.3 Harmful Action Replacement

The computer system can also detect harmful activities within the first action and configure the corresponding nominal and alternate behaviors to emulate harmful activities with reduced risk to the target asset, a user, and the target network.

For example, for the first action, the computer system can: detect data lost during the first action at the machine from the attack record; characterize a technique and a procedure executed by the machine to access the lost data; create mock data analogous to these lost data for loading onto the target asset (or other asset on the target network) prior to executing the attack graph; define a nominal behavior according to the technique and the procedure characteristic of the first action; and select an external agent to receive the mock data if successfully accessed by the target network when executing behaviors of the first node. More specifically, the computer system can: generate mock data of a similar size and format as sensitive data prescribed in the attack record; write a location, address, or other descriptor of the mock data to the nominal and alternate behaviors for the first action; and generate a flag to preload the target asset (or other internal or external asset) with the mock data before executing the attack graph.

In another example, for the first action, the computer system can: detect a hostile hard drive encryption during the first action at the machine from the attack record; characterize a technique and a procedure executed by the machine to encrypt these data; create mock data analogous to (e.g., of a similar size and data format) to data encrypted during the previous attack according to the attack record; generate a flag to load these mock data onto the target asset prior to executing the attack graph; and define a nominal behavior according to the technique and procedure that produced hostile data encryption during the first action.

However, the computer system can implement any other method or technique to generate a set of nominal and alternate behaviors—selectively paired with mock data—for the first action defined in the attack record.

8.4 Next Action and Next Node

The computer system can then repeat this process for each other action in the known attack and populate corresponding nodes in the attack graph with nominal and alternate behaviors and hierarchies.

8.5 Asset State Return

In one variation, the computer system further: defines a set of reversing behaviors executable by the target surface upon completion of the attack graph to return the target asset to a pre-attack graph state; and stores these behaviors in the attack graph.

In one implementation, for the first action in the sequence of actions, the computer system: defines a first reversing behavior executable by the target asset to transition from a first end condition associated with the first action to a first start condition associated with the first action; and stores the first reversing behavior in a last node in the set of nodes in the attack graph. In this implementation, for a second action in the sequence of actions, the computer system: defines a second reversing behavior executable by the target asset to transition from a second end condition associated with the second action to a second start condition associated with the second action; and stores the second reversing behavior in a penultimate node in the set of nodes in the attack graph; etc. For example, for a node that includes nominal and alternate behaviors that specify downloading a file, the computer system can generate reversing behavior that includes deleting the file. In another example, for a node that includes nominal and alternate behaviors that specify opening a particular communication port, the computer system can generate reversing behavior that includes closing the particular communication port. In yet another example, for a node that includes nominal and alternate behaviors that specify opening and streaming a camera feed, the computer system can generate reversing behavior that includes closing the camera feed.

In this implementation, when executing the knowledge graph, the target asset can store an identifier of each completed behavior. Upon completing the attack graph, the target asset can: aggregate identifiers of these completed behaviors; select or retrieve a sequence of reversing behaviors corresponding to these completed behaviors; and sequentially execute these particular reversing behaviors in reverse order of the completed nominal and alternate behaviors.

8.6 Attack Graph Generation

Generally, the computer system can compile these nominal and alternate behaviors into the attack graph executable by the target asset on the target network to emulate the known attack that occurred previously on the machine on the reference network.

For example, the computer system can generate a first subset of nodes storing nominal behaviors and alternative behaviors, the first subset of nodes including: a first node corresponding to a first action in the sequence of actions representing the malicious attack; a second node corresponding to a second action in the sequence of actions representing the malicious attack; and a third node corresponding to a third action in the sequence of actions representing the malicious attack.

In this example, the computer system can: link the first subset of nodes in the attack graph, storing nominal behaviors and alternative behaviors, according to the sequence of actions representing the malicious attack in the attack record; and link a second subset of nodes in the attack graph, storing reversing behaviors, according to an inverse of the sequence of actions representing the malicious attack in the attack record; etc.

8.7 Example: Target Attack

In one example, for a first action in the sequence of actions, the computer system: defines a first nominal behavior prescribing downloading a payload from an email to emulate a first end condition at the target asset according to the first action in the known attack; and defines a first alternative behavior prescribing downloading the payload from a website to emulate the first end condition at the target asset according to the first action in the known attack.

In this example, for a second action in the sequence of actions, the computer system can also define a second nominal behavior prescribing executing the payload to emulate a second end condition at the target asset according to the second action in the known attack.

In this example, for a third action in the sequence of actions, the computer system can: define a third nominal behavior prescribing copying data, detected in memory, of a target data type to emulate a third end condition at the target asset according to the third action in the known attack; and define a third alternative behavior prescribing copying data, detected in memory and of the target data type, with evasive security procedures to emulate the third end condition at the target asset according to the third action in the known attack.

In this example, for a fourth action in the sequence of actions, the computer system can: define a fourth nominal behavior prescribing creating a share, moving data of the target data type, removing the share, and sending notification pings at a first frequency to emulate a fourth end condition at the target asset according to the fourth action in the known attack; and define a fourth alternative behavior prescribing creating the share, moving data of the target data type, removing the share, and sending notification pings at a second frequency less than the first frequency to emulate the fourth end condition at the target asset according to the fourth action in the known attack.

Furthermore, for a fifth action in the sequence of actions, the computer system can: define a fifth nominal behavior prescribing transmitting data of the target data type unencrypted to a second machine to emulate a fifth end condition at the target asset according to the fifth action in the known attack; and define a fifth alternative behavior prescribing transmitting encrypted data of the target data type to the second machine to emulate the fifth end condition at the target asset according to the fifth action in the known attack.

In this example, the computer system can also: generate a set of data of the target data type and including mock values; select the second machine external to the target network; and load the set of data onto the target asset prior to the first time period. Later, the computer system can characterize the target network as vulnerable to the known attack in response to receipt of the set of target data by the second machine during the first time period.

Thus, in this example, the computer system can generate an attack graph executable by a target asset to emulate a network breach in which an attacker: downloads a payload to a contractor device via a phishing email; collects login credentials via the execution of the payload; logs into a network; detects and collects new write data containing credit card information; generates pings to a remote machine to offload these data; and exfiltrates these data. However, the computer system can also generate mock data to replace credit card data from the known attack and can reconfigure nominal and alternate behaviors for the corresponding action to detect and collect these mock data rather than authentic credit card data. Thus, when executing this attack graph, the target asset can emulate this breach by attempting different paths for each stage of the attack but exfiltrate mock—and therefore low-value—data from the target network.

9. Self-Contained Emulation Package

Figure 5:
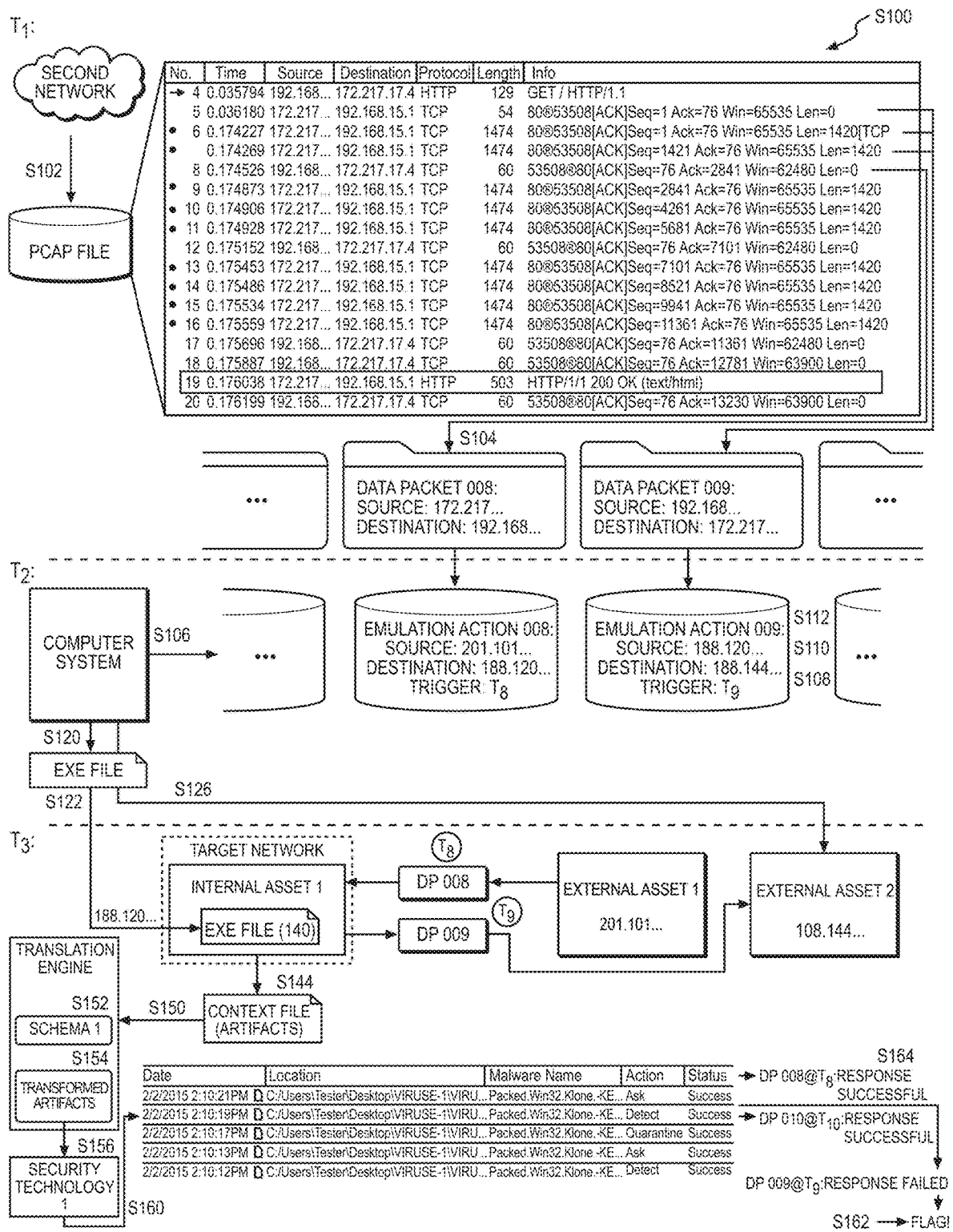
FIG. 5 is a flowchart representation of one variation of the method.

Generally, the computer system can: generate a self-contained attack emulation package—such as an executable file (or binary)—that includes the data packets, the attack emulation schedule, and/or the attack graph in Block S120; and deploy this attack emulation package to a target asset (e.g., an internal asset within the target network) in Block S122, as shown in FIGS. 5 and 6.

In one implementation, the computer system generates an executable file including instructions that, when executed by a processor(s) of a target asset (e.g., the first internal asset), cause the processor(s): to access the set of data packets from the executable file; to store the set of data packets (e.g., a first data packet to which the first internal asset and the second external asset are assigned) in local memory of the target asset; to initiate transmission of data packets (e.g., the first data packet) from the target asset to other assets (e.g., the second external asset), selected for the emulation, according to behavior triggers in the set of behavior triggers; and to generate a context file specifying a set of artifacts representing indicators of the malicious attack responsive to reception of data packets in the set of data packets at the target asset and/or transmission of data packets in the set of data packets from the target asset.

Therefore, the computer system enables an operator: to load the attack emulation package on the target asset, such as an internal asset within the target network that excludes an internal agent installed thereon; and to configure the target asset, upon execution of the attack emulation package at the target asset, to execute steps of attack emulation on the target network.

9.1 Executable File

Block S120 of the method S100 recites generating an executable file: including the set of data packets; defining the set of behavior triggers; and configured to trigger the first internal asset to generate a context file specifying a first set of artifacts according to a first format.

Generally, in Block S120, the computer system can generate an executable file including data and instructions to configure the target asset to execute steps of attack emulation on the target network.

In one implementation, the computer system generates the executable file representing the attack graph and configured to trigger the target asset (e.g., the first internal asset) to execute behaviors stored in the set of nodes in the attack graph.

More specifically, the computer system can generate the executable file representing the attack graph and configured to trigger the target asset to selectively execute nominal behaviors and alternative behaviors, according to behavior hierarchies, stored in the set of nodes in the attack graph.

Additionally or alternatively, the computer system generates the executable file including the set of data packets and the emulation schedule. More specifically, the computer system can generate the executable file populated with: the set of data packets of the emulation; and a set of transmission triggers (and/or behavior triggers) assigned to the set of data packets.

Additionally, the computer system can generate the executable file storing instructions (or commands) that, when executed by the first internal asset, cause the first internal asset: to identify a first subset of data packets, in the set of data packets, to which the first internal asset is assigned as a source asset; to identify a first subset of transmission triggers, in the set of transmission triggers, assigned to the first subset of data packets; and to selectively initiate transmission of data packets—in the first subset of data packets—according to the first subset of transmission triggers during the emulation.

In one variation, the computer system: identifies the first subset of data packets to which the first internal asset is assigned as a source asset; and identifies the first subset of transmission triggers assigned to the first subset of data packets. The computer system can then generate the executable file: including the first subset of data packets; and defining the first set of transmission triggers.

For example, the computer system can: assign a first transmit time to a first data packet in the set of data packets; assign a second external asset to receive the first data packet; assign the first internal asset to transmit the first data packet to the second external asset according to the first transmit time; and replace a first source IP address, designated in the first data packet, with the IP address of the first internal asset. In this example, the computer system can: identify a first subset of data packets—in the set of data packets and to which the first internal asset is assigned as a source asset—including the first data packet; identify a first subset of transmission triggers including the first transmit time; and generate the executable file including the first subset of data packets and the first subset of transmission triggers.

Accordingly, the computer system can generate the executable file including a subset of data packets, in the set of data packets, for transmission by the first internal asset during the emulation—rather than the set of data packets in entirety—thereby reducing total file size of the executable file and reducing memory overhead during execution of the executable file at the first internal asset.

In another implementation, the computer system can generate the executable file configured to: trigger storage of the first subset of data packets, from the executable file, in local memory of the first internal asset (e.g., during a first time period preceding initiation of the emulation); and trigger removal of the first subset of data packets from local memory of the first internal asset (e.g., during a second time period succeeding completion of the emulation).

9.2 Context File

In one implementation, the computer system generates the executable file configured to trigger the target asset (e.g., the first internal asset) to generate a context file specifying a set of artifacts representing indicators of the malicious attack according to a first format (e.g., field values, attribute values, data format, data structure).

More specifically, the computer system can generate the executable file configured to trigger the target asset to generate the context file specifying the set of artifacts responsive to: reception of data packets in the set of data packets at the target asset; transmission of data packets in the set of data packets from the target asset; execution of behaviors corresponding to behavior triggers in the set of behavior triggers; and/or execution of behaviors in the set of nodes in the attack graph.

In one example, the computer system generates an attack graph, the attack graph including: a first node corresponding to a first action in a sequence of actions representing a malicious attack; a second node corresponding to a second action in the sequence of actions representing the malicious attack; and a third node corresponding to a third action in the sequence of actions representing the malicious attack.

In this example, the computer system generates an executable file representing the attack graph and configured to trigger the target asset (e.g., the first internal asset): to record a first artifact corresponding to the first action in response to execution of a first behavior, stored in the first node, at the target asset; record a second artifact corresponding to the second action in response to execution of a second behavior, stored in the second node, at the target asset; and exclude a third artifact from the set of artifacts corresponding to the third action in response to failed execution of a third behavior, stored in the third node, at the target asset.

In this example, the computer system generates the executable file configured to trigger the target asset to generate a context file—specifying the first artifact and the second artifact—in response to termination of the attack emulation.

Alternatively, the computer system can generate the executable file configured to trigger the target asset: to record the third artifact in the set of artifacts corresponding to the third action in response to attempted (but failed) execution of the third behavior, stored in the third node, at the target asset; and to generate a context file—specifying the first artifact, the second artifact, and the third artifact—in response to termination of the attack emulation.

Accordingly, the computer system can trigger the target asset to generate and output a context file specifying artifacts present on the target asset responsive to behaviors attempted or completed by the target asset during the attack emulation on the target network.

Therefore, the computer system can serve the context file to one or more security technologies deployed on the target network in order to verify whether these security technologies deployed on the target network are properly configured to respond to an authentic analogous attack on the target network based on whether these security technologies generate detection, prevention, or alert events related to these behaviors based on the artifacts specified in the context file.

10. Attack Emulation Configuration

Block S126 of the method S100 recites scheduling the second external asset to automatically execute behaviors stored in the set of nodes in the attack graph in response to execution of the executable file at the first internal asset.

Generally, in Block S126, the computer system can configure the set of assets to execute the attack emulation. More specifically, the computer system can trigger storage of each data packet to its corresponding source asset for storage in local memory.

In one implementation, the computer system uploads the executable file to the first internal asset. For example, the computer system can store the executable file to a data repository (e.g., a cloud storage volume) for loading onto the first internal asset.

Additionally or alternatively, the computer system stores the executable file onto a removable memory storage device for (manual) loading onto the first internal asset. An operator may then: connect the removable memory storage device to the first internal asset; and load the executable file onto the first internal asset.

In this implementation, in response to executing the executable file, the first internal asset stores the first subset of data packets, from the executable file and assigned to the first internal asset, in local memory of the first internal asset. Additionally, the first internal asset extracts the first subset of transmission triggers—from the executable file—corresponding to the first subset of data packets. Additionally or alternatively, the first internal asset stores the attack graph in local memory of the first internal asset.

In another implementation, the computer system triggers storage of a subset of data packets, in the set of data packets and assigned to an external asset, in local memory of the external asset. For example, the computer system can trigger storage of a second subset of data packets, in the set of data packets and assigned to the second external asset, in local memory of the second external asset. Additionally, the computer system can transmit a second subset of transmission triggers, in the set of transmission triggers and corresponding to the second subset of data packets, to the second external asset.

Additionally or alternatively, the computer system can: trigger storage of the attack graph in local memory of the external asset; and schedule the external asset to automatically execute behaviors stored in the set of nodes in the attack graph in response to execution of the executable file at the first internal asset in Block S126.

10. Attack Emulation

Block S128 of the method S100 recites initiating transmission of the set of data packets from source assets to recipient assets, in the set of assets, according to the set of behavior triggers to emulate the malicious attack on the target network.

Generally, in Block S128, the computer system can initiate the attack emulation on the target network. More specifically, in response to execution of the executable file at the first internal asset, the computer system can initiate transmission of the set of data packets from source assets to recipient assets, in the set of assets, according to the set of transmission triggers (and/or the set of behavior triggers) to emulate the malicious attack on the target network. During this emulation attack, source assets can automatically transmit their assigned data packets to designated destination assets within and external to the target network according to time- and/or action-based triggers associated with these data packets responsive to triggers distributed to these assets by the computer system.

For example, in response to executing the executable file, the first internal asset can initiate transmission of a first data packet in the set of data packets from the first internal asset to the second external asset according to a first behavior trigger in the set of behavior triggers.

Additionally or alternatively, in response to executing the executable file, the first internal asset (or another asset) can: select a first node in the attack graph; execute a first script defining a first behavior in the first node; move to the second node in the attack graph if the first script successfully completes; execute a second script defining a second behavior in the first node if the first behavior fails to complete; move to the second node if the second behavior successfully completes; and repeat this process until the first internal asset either completes a behavior in the first node or attempts all behaviors in the first node. The first internal asset then repeats this process for each subsequent node of the attack graph or until the first internal asset fails to complete any single behavior in one node of the attack graph.

For example, in response to executing the executable file, the first internal asset can: access an attack graph including a set of nodes connected according to the sequence of actions executed on a machine within the reference computer network during the malicious attack on the reference computer network in Block S130; execute a first behavior, stored in a first node in the set of nodes, corresponding to a first action in the sequence of actions representing the malicious attack in Block S132; execute a second behavior, stored in a second node in the set of nodes, corresponding to a second action in the sequence of actions representing the malicious attack in Block S136; and attempt execution of a third behavior, stored in a third node in the set of nodes, corresponding to a third action in the sequence of actions representing the malicious attack in Block S140.

10.1 Action-Based Trigger

In one implementation, upon receipt of a "start" command from the computer system, a first asset transmits a first data packet—stored locally at the first asset—to a second asset. Upon receipt of the first data packet from the first asset, the second asset transmits a second data packet—stored locally at the second agent—to a third asset according to a first action-based trigger associated within the second data packet.

For example, the computer system can: recombine a first cluster of packet fragments, designating a first source address and a first destination address within the PCAP file, to generate a first data packet; and recombine a second cluster of packet fragments, designating a second source address and a second destination address within the PCAP file, to generate a second data packet. The computer system can then: assign a first transmit time, at a (absolute) scheduled start time of the emulation, to the first data packet; and assign a second transmit trigger, responsive to receipt of the first data packet, to the second data packet based on the PCAP file representing transmission of the second data packet succeeding transmission of the first data packet during the malicious attack on the reference network. Later, during the attack emulation, a second external asset—designated to a source asset for the first data packet—can transmit the first data packet to the first internal asset, designated as a recipient asset for the first data packet, at the first transmit time. In response to receipt of the first data packet, the first internal asset —designated as a source asset for the second data packet—can transmit the second data packet to the first asset (or to another recipient asset) according to the second transmit trigger. More specifically, the first internal asset can transmit the second data packet to the first asset according to the second transmit trigger via an IP address—of the second external asset—designated in the second data packet stored in local memory of the first internal asset.

In one variation, in response to receipt of the first data packet, the first internal asset can generate a first message indicating receipt of the first data packet from the second external asset; and transmit the first message to the computer system.

In response to receiving the first message from the first internal asset, the computer system transmits a "transmit" command—corresponding to the second transmit trigger— to the first internal asset, which then transmits the second data packet to the first asset (or to another recipient asset) according to the second transmit trigger.

Therefore, in this variation, the computer system can: track completion of an emulation action of the attack emulation; and trigger execution of a next emulation action according to the attack emulation schedule.

10.2 Multi-Asset Attack Graph

In another variation, the computer system: generates a paired set of attack graphs executable concurrently by a set of target assets; and implements methods and techniques described in U.S. patent application Ser. No. 17/832,106 and/or U.S. patent application Ser. No. 17/083,275 to coordinate execution of individual nodes in each attack graph by these target assets in order to emulate—on the target network—a previous coordinated multi-asset attack on the reference network.

For example, the computer system can access the attack record that defines: a first sequence of actions executed on a first machine on the reference computer network during a known attack on the reference computer network; and a second sequence of actions executed on a second machine on the reference computer network during the known attack on the reference computer network. The computer system can then execute methods and techniques described above: to generate a first attack graph based on the first sequence of actions; and to generate a second attack graph based on the second sequence of actions.

The computer system can then: schedule the first target asset on the target network to selectively execute nominal behaviors and alternative behaviors stored in the first set of nodes in the first attack graph during a particular time period; and similarly schedule a second target asset on the target network to selectively execute nominal behaviors and alternative behaviors stored in the second set of nodes in the second attack graph during the particular time period.

10.2 Context File Generation

Block S144 of the method S100 recites generating the context file including the set of artifacts in response to termination of the emulation of the malicious attack on the target computer network.

Generally, the first internal asset can: record artifacts responsive to execution (or attempted execution) of behaviors of the attack emulation; and generate a context file specifying these artifacts representing indicators of the malicious attack. Additionally, the first internal asset can generate the context file responsive to reception of data packets— in the set of data packets of the PCAP file—at the first internal asset; and/or transmission of data packets in the set of data packets from the first internal asset.

In one implementation, the first internal asset executes the foregoing methods and techniques: to access an attack graph including a set of nodes connected according to the sequence of actions executed on a machine within the reference computer network during the malicious attack on the reference computer network in Block S130; and to execute a first behavior, stored in a first node in the set of nodes, corresponding to a first action in the sequence of actions representing the malicious attack in Block S132.

In this implementation, the first internal asset records a first artifact (or a first subset of artifacts) in the set of artifacts corresponding to the first action in response to executing the first behavior in Block S134.

Then, the first internal asset executes the foregoing methods and techniques: to execute a second behavior, stored in a second node in the set of nodes, corresponding to a second action in the sequence of actions representing the malicious attack in Block S136; and to record a second artifact (or a second subset of artifacts) in the set of artifacts corresponding to the second action in response to executing the second behavior in Block S138.

The first internal asset can repeat the foregoing methods and techniques for each subsequent node of the attack graph or until the first internal asset fails to complete any single behavior in one node of the attack graph.

For example, the first internal asset can: attempt execution of a third behavior, stored in a third node in the set of nodes, corresponding to a third action in the sequence of actions representing the malicious attack in Block S140; and exclude a third artifact from the set of artifacts corresponding to the third action in response to failed execution of the third behavior in Block S142.

Alternatively, the first internal asset can: record the third artifact (or a third subset of artifacts) in the set of artifacts corresponding to the third action in response to attempted (but failed) execution of the third behavior, stored in the third node, at the first internal asset.

In another implementation, the first internal asset: generates a context file specifying the set of artifacts in response to termination of the attack emulation on the target network; and stores the context file in a data repository (e.g., a storage device local to the first internal asset, a removable memory storage device, a remote data repository).

Therefore, the first internal asset can generate a log indicating artifacts present on the first internal asset responsive to behaviors attempted or completed by the first internal asset during the attack emulation on the target network for analysis by security personnel and/or a security technology deployed on the target network.

In another implementation, the computer system can repeat the foregoing methods and techniques for each asset in the set of assets selected as actors in the emulation of the malicious attack on the target network.

For example, the computer system can trigger the second external asset to generate a second context file specifying a second set of artifacts in Block S146, the set of artifacts representing indicators of the malicious attack responsive to execution of behaviors stored in the set of nodes in the attack graph at the second external asset.

10.2.1 Example: Target Attack Execution and Context File

In one example, for a first action in the sequence of actions, the first internal asset: executes a first alternative behavior prescribing downloading a payload from a website to emulate the first end condition at the first internal asset according to the first action in the known attack; and records a first artifact representing a domain name corresponding the website hosting the payload.

In this example, for a second action in the sequence of actions, the first internal asset: executes a second nominal behavior prescribing executing the payload to emulate a second end condition at the target asset according to the second action in the known attack; and records a second artifact representing a modification to a registry key at the first internal asset.

In this example, for a third action in the sequence of actions, the first internal asset: attempts execution of a third alternative behavior prescribing copying data, detected in memory and of the target data type, with evasive security procedures to emulate the third end condition at the target asset according to the third action in the known attack; and records a third artifact representing a file hash corresponding to the data.

In this example, the computer system terminates the attack emulation on the target network in response to the first internal asset failing to complete any single behavior in the third node of the attack graph. In response to termination of the attack emulation on the target network, the first internal asset generates a contexts file specifying a set of artifacts—including the first artifact, the second artifact, and the third artifact—representing indicators of the malicious attack on the target network.

10.3 Variation: Dynamic Asset Allocation and Address Replacement

Block S124 of the method S100 recites, in response to execution of the executable file at the first internal asset, triggering replacement of the first source address with a third address of the second external asset.

In one variation, the computer system: automatically designates the first internal asset for the emulation; and dynamically assigns (or selects) an external asset(s), from the pool of external assets, for the emulation during runtime of the executable file at the first internal asset.

In this variation, the computer system generates the executable file including instructions: to query the computer system for IP addresses of external assets designated as actors for the emulation; and to replace external source IP addresses and external destination IP addresses—represented in the set of data packets—with the IP addresses of these external assets.

In response to accessing and executing the executable file, the first internal asset queries the computer system for IP addresses of external assets designated as actors for the emulation.

The computer system: receives the query from the first internal asset; and executes the foregoing methods and techniques to assign external assets, from the pool of assets, for the emulation. The computer system then triggers replacement of external source IP addresses and external destination IP addresses with the IP addresses of these external assets in Block S124.

For example, the computer system can: generate a message indicating IP addresses of these external assets; and transmit the message to the first internal asset. More specifically, the computer system can generate the message exhibiting plain text format, thereby reducing risk of filtering and/or prevention of the message by security technologies deployed on the target network and/or the first internal asset.

In response to receiving the message, the first internal asset executes similar methods and techniques to replace external source IP addresses and external destination IP addresses with the IP addresses of these external assets.

In one example, in response to executing the executable file containing a first data packet designating a first external destination IP address, the first internal asset can query the computer system for a target IP address of a recipient asset (e.g., an external asset) to receive the first data packet.

In response to receiving the query from the first internal asset, the computer system can: select a second external asset, from the pool of external assets, as an actor to emulate the external machine during the emulation of the malicious attack on the target network; generate a first message—exhibiting plain text format—a second IP address of the second external asset; and transmit the first message to the first internal asset.

In response to receiving the first message from the computer system, the first internal asset can replace the first external destination IP address, designated in the first data packet, with the second IP address of the second external asset.

Therefore, the computer system can dynamically assign the second external asset, from the pool of external assets, for the emulation—on-demand and based on availability of the second external asset—during runtime of the executable file at the first internal asset.

In another example, in response to executing the executable file containing a first data packet designating a first external source IP address and a second internal destination IP address (e.g., an IP address of the first internal asset), the first internal asset can query the computer system for a target IP address of a source asset (e.g., an external asset) to transmit the first data packet.

In response to receiving the query from the first internal asset, the computer system can: select a second external asset, from the pool of external assets, as an actor to emulate the external machine during the emulation of the malicious attack on the target network; generate a first message—exhibiting plain text format—specifying a third IP address of the second external asset; and transmit the first message to the first internal asset.

In response to receiving the first message from the computer system, the first internal asset can replace the first external source IP address, designated in the first data packet, with the third IP address of the second external asset.

In this example, the computer system executes the foregoing methods and techniques to initiate transmission of the set of data packets. More specifically, the computer system can initiate transmission of the first data packet from the second external asset to the first internal asset, according to a first behavior trigger, via the third address of the second asset. In response to receiving the first data packet, the first internal asset can record a first artifact indicating reception of the first data packet from the third address of the second asset.

11. Context File Distribution

The method S100 includes: accessing the context file specifying the first set of artifacts and generated by the first internal asset in response to termination of the emulation of the malicious attack on the target computer network in Block S150; transforming the first set of artifacts into a second set of artifacts according to a second format associated with a target security technology deployed on the target computer network in Block S154; and serving the second set of artifacts to the target security technology in Block S156.

Generally, in Blocks S150, S152, S154, and S156, the computer system can: access a context file generated by a target asset responsive to execution of behaviors stored in the set of nodes in the attack graph; translate the context file into a format compatible with a security technology (e.g., a security information and event management system) deployed on the target computer network; and serve the context file to the security technology.

In one implementation, the computer system: accesses a context file generated by the first internal asset and specifying a set of artifacts representing indicators of the malicious attack according to a first format in Block S150; accesses a target schema defining a second format associated with a target security technology deployed on the target computer network in Block S154; transforms the set of artifacts into a second set of artifacts representing indicators of the malicious attack according to the second format in Block S156; and serves the second set of artifacts to the target security technology in Block S158.

In this implementation, the target security technology generates a set of event records responsive to the second set of artifacts (and/or the context file) representing the attack emulation.

For example, the target security technology can: access the second set of artifacts; correlate the second set of artifacts with a pattern or relationship representing the malicious attack; and generate an event record (or log), in the set of event records, for a detection, prevention, or alert event indicating the malicious attack based on the second set of artifacts.

Alternatively, the target security technology can: access the second set of artifacts; and, in response to failing to correlate the second set of artifacts with a pattern or relationship representing the malicious attack, generate the set of event records without an event record for a detection, prevention, or alert event indicating the malicious attack.

Therefore, the computer system can: access a context file—representing behaviors attempted or executed during the attack emulation—characterized in a universal format; translate the context file into a specific format compatible with a target security technology; and serve the context file to the target security technology in order to verify whether the target security technology is properly configured to respond to an authentic analogous attack on the target network based on whether the target security technology generates detection, prevention, or alert events related to these behaviors based on the artifacts specified in the context file.

11.1 Translation Engine

In another implementation, the computer system includes a translation engine (e.g., an application) that: accesses a context file specifying a first set of artifacts according to a first format; accesses a target schema defining a target format associated with a target security technology deployed on the target computer network; transforms the first set of artifacts into a second set of artifacts representing indicators of the malicious attack according to the second format; and serves the second set of artifacts to the target security technology.

For example, the computer system can include a first translation engine that: accesses a context file specifying a first set of artifacts according to a first format; accesses a first schema defining a second format associated with a first security technology deployed on the target computer network; transforms the first set of artifacts into a second set of artifacts representing indicators of the malicious attack according to the second format; and serves the second set of artifacts to the first security technology.

In this example, the computer system also includes a second translation engine that: accesses the context file specifying the first set of artifacts according to the first format; accesses a second schema defining a third format associated with a second security technology deployed on the target computer network; transforms the first set of artifacts into a third set of artifacts representing indicators of the malicious attack according to the third format; and serves the third set of artifacts to the second security technology.

11.2 Context File Access

In one implementation, in Block S150, the computer system (e.g., the translation engine) accesses a context file generated by the first internal asset.

In one example, the computer system can retrieve the context file from the data repository storing the context file.

In another example, the computer system can receive the context file from the first internal asset (or a removable memory storage device).

11.3 Artifact Translation

In another implementation, the computer system (e.g., the translation engine): accesses a first schema defining a second format associated with a first security technology deployed on the target computer network in Block S152; and transforms the first set of artifacts into a second set of artifacts representing indicators of the malicious attack according to the second format in Block S154.

For example, the computer system can access the context file specifying a first set of artifacts including: a first artifact corresponding to a first action responsive to execution of a first behavior, stored in a first node of the attack graph, at the first internal asset; a second artifact corresponding to a second action responsive to execution of a second behavior, stored in a second node of the attack graph, at the first internal asset; and a third artifact corresponding to a third action responsive to execution of a third behavior, stored in a third node of the attack graph, at the first internal asset. The first artifact can represent a hash value corresponding to the first behavior executed by the first internal asset. The second artifact can represent a connection between the first internal asset and an address of the second external asset. The third artifact can represent a modification to a registry key at the first internal asset.

In this example, the computer system can: access the context file specifying a first object representing the first artifact and characterized by a first field value (e.g., "event_timestamp") and a first attribute value (e.g., "1 Jun. 2022 13:02:43") corresponding to the first field value; access the first schema defining a mapping between the first field value and a second field value (e.g., "event_time") according to the second format compatible with the first security technology; and transform the first object into a second object representing a second artifact in the second set of artifacts, the second object characterized by the second field value and a second attribute value (e.g., "Jun. 1, 2022 01:02:43 PM") corresponding to the second field value according to the second format.

The computer system can repeat the foregoing methods and techniques for each field value and/or attribute value in the first object.

The computer system can repeat the foregoing methods and techniques for each object representing an object in the set of artifacts to generate the second set of artifacts.

12. Security Technology Validation

The method S100 includes: accessing a set of event records generated by the target security technology responsive to the second set of artifacts in Block S160; and, in response to absence of an event record in the set of event records indicating the malicious attack, generating a prompt to reconfigure the target security technology to detect the malicious attack at the target computer network in Block S162.

Block S164 of the method S100 recites, in response to presence of an event record in the set of event records indicating the malicious attack, confirming configuration of the security technology to respond to the malicious attack.

The method S100 includes: accessing an event record indicating the malicious attack and generated by the target security technology based on the second set of artifacts in Block S160; generating a visualization representing the event record indicating the malicious attack in Block S166; and serving the visualization at an interface in Block S168.

Generally, in Blocks S160, S162, and S164, the computer system can: access a set of event records generated by a security technology responsive to the context file; and verify whether the security technology is properly figured to respond to (e.g., detect, prevent, log, alert) the malicious attack based on presence (or absence) of an event record in the set of event records for a detection, prevention, or alert event indicating the malicious attack. The computer system can: compare detection, prevention, and alert events thus associated with the emulation action to target response types assigned to these emulation actions or to the attack emulation more generally in order to validate a current configuration of security technologies deployed to the target network; and then selectively prompt investigation and reconfiguration of these security technologies responsive to failure of these security technologies to respond to the attack as planned.

In one implementation, the computer system: accesses a first set of event records generated by a first security technology responsive to the second set of artifacts.

For example, the computer system can access the first set of event records via an application programming interface communicatively coupling the computer system and the first security technology.

In this implementation, the computer system: detects presence of an event record in the set of event records indicating the malicious attack; and confirms configuration of the security technology to respond to the malicious attack.

Additionally, the computer system can: generate a visualization representing the event record indicating the malicious attack; and serving the visualization at an interface (e.g., a security portal).

For example, the computer system can: detect presence of a set of detection event records generated by the first security technology and indicating detection of behaviors, occurring at the first internal asset and/or on the target network, by the first security technology; confirm configuration of the security technology to respond to the malicious attack; generate a visualization representing the set of detection event records; and serve the visualization at an interface.

Alternatively, the computer system can: detect absence of an event record in the set of event records indicating the malicious attack; and generate a prompt to reconfigure the target security technology to detect the malicious attack at the target computer network.

12.1 Security Technology Event Visualization

In one implementation, for each emulation action (or behavior) in the attack emulation, the computer system verifies that at least one security technology (or a particular security technology) detected, prevented, or alerted on the emulation action (or behavior) according to a response type assigned to this emulation action (or behavior); if not, the computer system flags these security technologies (or the particular security technology) for investigation and reconfiguration. Additionally or alternatively, the computer system can verify that at least one security technology (or a particular security technology) detected, prevented, or alerted on the attack emulation as a whole according to a response type assigned to this attack emulation; if not, the computer system can flag these security technologies as not properly configured to respond to an analogous attack on the target network and prompt further investigation and reconfiguration of these security technologies accordingly.

For example, the computer system can return these validation results to a security portal—accessible by security personnel—within a native application or web browser executing on a personal computing device. The security portal can then: render a list of emulation actions (or behaviors) within the attack emulation; label each of these emulation actions (or behaviors) with identifiers of assigned source and destination assets; indicate responses by deployed security technologies on the target network to these emulation actions; and label each emulation attack with its corresponding validation result. The security portal can also highlight or flag each individual emulation action (or behavior) that failed to yield a target response by at least one security technology and/or indicate whether these security technologies failed to produce a target global response to the attack emulation. However, the computer system and the security portal can present validation results for the attack emulation to security personnel in any other format in order to alert security personnel to a need to reconfigure or redeploy security technologies to the target network in order to detect and respond to future attacks analogous to the previous attack on the reference network.

12.2 Example: Multiple Security Technology Validations

In one example, the computer system executes the foregoing methods and techniques: to access a context file specifying a first set of artifacts according to a first format; to access a first schema defining a second format associated with a first security technology deployed on the target computer network; to transform the first set of artifacts into a second set of artifacts representing indicators of the malicious attack according to the second format; and to serve the second set of artifacts to the first security technology.

In this example, the computer system: accesses a first set of event records generated by the first security technology responsive to the second set of artifacts; and, in response to presence of an event record in the first set of event records indicating the malicious attack, confirms configuration of the first security technology to respond to the malicious attack.

In this example, the computer system also executes the foregoing methods and techniques: to access a second schema defining a third format associated with a second security technology deployed on the target computer network; to transform the first set of artifacts into a third set of artifacts representing indicators of the malicious attack according to the third format; and to serve the third set of artifacts to the second security technology.

In this example, the computer system: accesses a second set of event records generated by the second security technology responsive to the third set of artifacts; and, in response to absence of an event record in the second set of event records indicating the malicious attack, generates a prompt to reconfigure the second security technology to detect the malicious attack at the target computer network.

Therefore, the computer system can: translate the context file according to different formats for different security technologies; and verify whether these security technologies are properly configured to respond to the malicious attack based on presence (or absence) of an event record generated by each security technology for a detection, prevention, or alert event indicating the malicious attack.

14. Conclusion

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method comprising:
 accessing a set of data packets representing data transmitted between machines in communication with a reference computer network during a malicious attack on the reference computer network during a first time period;
 selecting a set of assets as actors in an emulation of the malicious attack, the set of assets comprising:
  a first internal asset within a target computer network; and
  a second external asset external to the target computer network;
 for each data packet in the set of data packets:
  assigning a behavior trigger, in a set of behavior triggers, to the data packet based on a corresponding behavior during the malicious attack on the reference computer network;
  assigning a recipient asset, in the set of assets, to receive the data packet; and
  assigning a source asset, in the set of assets, to transmit the data packet to the recipient asset according to the behavior trigger; and
 initiating transmission of the set of data packets from source assets to recipient assets, in the set of assets, according to the set of behavior triggers to emulate the malicious attack on the target network.

2. The method of claim 1:
 further comprising generating an executable file:
  comprising the set of data packets;
  defining the set of behavior triggers; and
  configured to trigger the first internal asset to generate a context file specifying a set of artifacts, the set of artifacts representing indicators of the malicious attack responsive to:
   reception of data packets in the set of data packets at the first internal asset; and
   transmission of data packets in the set of data packets from the first internal asset; and
 wherein initiating transmission of the set of data packets comprises initiating transmission of the set of data packets in response to execution of the executable file at the first internal asset.

3. The method of claim 2, further comprising:
 serving the context file to a security technology deployed on the target computer network in response to termination of the emulation of the malicious attack on the target computer network;
 accessing a set of event records generated by the security technology responsive to the set of artifacts in the context file; and
 in response to absence of an event record in the set of event records indicating the malicious attack, generating a prompt to reconfigure the security technology to detect the malicious attack at the target computer network.

4. The method of claim 2, further comprising:
 accessing a set of event records generated by a security technology, deployed on the target computer network, based on the set of artifacts in the context file; and
 in response to presence of an event record in the set of event records indicating the malicious attack, confirming configuration of the security technology to respond to the malicious attack.

5. The method of claim 1:
 wherein accessing the set of data packets comprises accessing an attack record defining a sequence of actions executed on a machine within the reference computer network during the malicious attack on the reference computer network;
 further comprising generating an attack graph comprising a set of nodes connected according to the sequence of actions, each node in the set of nodes:
  corresponding to an action in the sequence of actions; and
  storing a set of behaviors analogous to the action and executable by a target asset to emulate an effect of the action on the machine in the reference computer network;
 further comprising generating an executable file:
  representing the attack graph; and
  configured to trigger the first internal asset to:
   execute behaviors stored in the set of nodes in the attack graph; and
   generate a context file specifying a set of artifacts, the set of artifacts representing indicators of the malicious attack responsive to execution of behaviors in the set of nodes in the attack graph; and
 wherein initiating transmission of the set of data packets comprises initiating transmission of the set of data packets in response to execution of the executable file at the first internal asset.

6. The method of claim 5:
 wherein generating the attack graph comprises generating the attack graph comprising the set of nodes comprising:

a first node corresponding to a first action in the sequence of actions representing the malicious attack;
a second node corresponding to a second action in the sequence of actions representing the malicious attack; and
a third node corresponding to a third action in the sequence of actions representing the malicious attack; and
wherein generating the executable file comprises generating the executable file configured to trigger the first internal asset to:
record a first artifact in the set of artifacts corresponding to the first action and in response to execution of a first behavior, stored in the first node, at the first internal asset;
record a second artifact in the set of artifacts corresponding to the second action and in response to execution of a second behavior, stored in the second node, at the first internal asset; and
exclude a third artifact from the set of artifacts corresponding to the third action and in response to failed execution of a third behavior, stored in the third node, at the first internal asset.

7. The method of claim 5, further comprising, at the first internal asset, in response to executing the executable file:
executing a first behavior, stored in a first node in the set of nodes, corresponding to a first action in the sequence of actions representing the malicious attack;
recording a first artifact in the set of artifacts corresponding to the first action in response to executing the first behavior;
executing a second behavior, stored in a second node in the set of nodes, corresponding to a second action in the sequence of actions representing the malicious attack;
recording a second artifact in the set of artifacts corresponding to the second action in response to executing the second behavior;
attempting execution of a third behavior, stored in a third node in the set of nodes, corresponding to a third action in the sequence of actions representing the malicious attack;
excluding a third artifact from the set of artifacts corresponding to the third action in response to failed execution of the third behavior; and
generating the context file comprising the set of artifacts in response to termination of the emulation of the malicious attack on the target computer network.

8. The method of claim 5, further comprising:
accessing the context file generated by the first internal asset responsive to execution of behaviors stored in the set of nodes in the attack graph, the set of artifacts comprising:
a first artifact in the set of artifacts corresponding to the first action responsive to execution of a first behavior, stored in the first node, at the first internal asset; and
a second artifact in the set of artifacts corresponding to the second action responsive to execution of a second behavior, stored in the second node, at the first internal asset;
serving the context file to a security technology deployed on the target computer network;
accessing a set of event records generated by the security technology responsive to the set of artifacts in the context file; and
in response to presence of an event record in the set of event records indicating the malicious attack, confirming configuration of the security technology to respond to the malicious attack.

9. The method of claim 5, further comprising:
scheduling the second external asset to automatically execute behaviors stored in the set of nodes in the attack graph in response to execution of the executable file at the first internal asset; and
triggering the second external asset to generate a second context file specifying a second set of artifacts, the second set of artifacts representing indicators of the malicious attack responsive to execution of behaviors stored in the set of nodes in the attack graph at the second external asset.

10. The method of claim 1, further comprising:
accessing a context file generated by the first internal asset responsive to transmission of data packets in the set of data packets and specifying a set of artifacts representing indicators of the malicious attack according to a first format;
accessing a target schema defining a second format associated with a target security technology deployed on the target computer network;
transforming the set of artifacts into a second set of artifacts representing indicators of the malicious attack according to the second format; and
serving the second set of artifacts to the target security technology.

11. The method of claim 10:
wherein assigning a behavior trigger, assigning a recipient asset, and assigning a source asset for each data packet in the set of data packets comprises:
assigning a first behavior trigger, in the set of behavior triggers, to a first data packet in the set of data packets;
assigning the first internal asset to receive the first data packet; and
assigning the second external asset to transmit the first data packet to the first internal asset according to the first behavior trigger;
further comprising generating an executable file:
comprising the first data packet designating a first source address and a second address of the first internal asset; and
configured to trigger the first internal asset to generate the context file;
further comprising, in response to execution of the executable file at the first internal asset, triggering replacement of the first source address with a third address of the second external asset;
wherein initiating transmission of the set of data packets comprises initiating transmission of the first data packet from the second external asset to the first internal asset, according to the first behavior trigger, via the third address of the second asset; and
wherein accessing the context file comprises accessing the context file specifying the set of artifacts comprising a first artifact indicating reception of the first data packet from the third address.

12. The method of claim 10:
wherein accessing the context file comprises accessing the context file specifying a first object representing a first artifact in the set of artifacts, the first object characterized by a first field value and a first attribute value corresponding to the first field value;

wherein accessing the target schema comprises accessing the target schema defining a mapping between the first field value and a second field value according to the second format; and wherein transforming the set of artifacts into the second set of artifacts comprises transforming the first object into a second object representing a second artifact in the second set of artifacts, the second object characterized by the second field value and a second attribute value corresponding to the second field value according to the second format.

13. The method of claim 10, further comprising:

accessing an event record indicating the malicious attack and generated by the target security technology based on the second set of artifacts;

generating a visualization representing the event record indicating the malicious attack; and serving the visualization at an interface.

14. The method of claim 10, wherein transforming the set of artifacts into the second set of artifacts comprises transforming the set of artifacts into the second set of artifacts representing indicators of the malicious attack according to the second format, the set of artifacts comprising:

a first artifact representing a hash value corresponding to a first behavior executed by the first internal asset;

a second artifact representing a connection between first internal asset and an address of the second external asset; and a third artifact representing a modification to a registry key at the first internal asset.

15. The method of claim 1, further comprising:

accessing a context file generated by the first internal asset responsive to transmission of data packets in the set of data packets and specifying a set of artifacts representing indicators of the malicious attack according to a first format;

accessing a first schema defining a second format associated with a first security technology deployed on the target computer network;

transforming the set of artifacts into a second set of artifacts representing indicators of the malicious attack according to the second format;

serving the second set of artifacts to the first security technology;

accessing a second schema defining a third format associated with a second security technology deployed on the target computer network;

transforming the set of artifacts into a third set of artifacts representing indicators of the malicious attack according to the third format;

serving the third set of artifacts to the second security technology;

accessing a first set of event records generated by the first security technology responsive to the second set of artifacts;

in response to presence of an event record in the first set of event records indicating the malicious attack, confirming configuration of the first security technology to respond to the malicious attack;

accessing a second set of event records generated by the second security technology responsive to the third set of artifacts; and in response to absence of an event record in the second set of event records indicating the malicious attack, generating a prompt to reconfigure the second security technology to detect the malicious attack at the target computer network.

16. A non-transitory computer-readable medium storing an executable file comprising instructions that, when executed by a processor of a first internal asset within a target computer network, cause the processor to:

access a set of data packets from the executable file, the set of set of data packets representing data transmitted between machines in communication with a reference computer network during a malicious attack on the reference computer network, each data packet in the set of data packets:

associated with a behavior trigger, in a set of behavior triggers, based on a corresponding behavior during the malicious attack on the reference computer network;

defining a recipient asset, in a set of assets, to receive the data packet; and defining the source asset, in the set of assets, to transmit the data packet to the recipient asset according to the behavior trigger;

store the set of data packets in local memory of the first internal asset, the set of data packets comprising a first data packet to which the first internal asset and a second external asset, in the set of assets and external to the target computer network, are assigned;

initiate transmission of the first data packet from the first internal asset to the second external asset according to a first behavior trigger in the set of behavior triggers; and generate a context file specifying a set of artifacts representing indicators of the malicious attack responsive to:

reception of data packets in the set of data packets at the first internal asset; and transmission of data packets in the set of data packets from the first internal asset.

17. The non-transitory computer-readable medium of claim 16, wherein the executable file further comprises instructions that, when executed by the processor, cause the processor to:

query a remote computer system for a target address of a recipient asset to receive the first data packet, the first data packet designating a first destination address;

in response to receiving a second address of the second external asset assigned to the first data packet, replace the first destination address designated in the first data packet with the second address of the second external asset; and in response to initiating transmission of the first data packet from the first internal asset to the second external asset according to the first behavior trigger, generate the context file specifying a first artifact, in the set of artifacts, indicating the second address.

18. The non-transitory computer-readable medium of claim 16, wherein the executable file further comprises instructions that, when executed by the processor, cause the processor to:

access an attack graph comprising a set of nodes connected according to the sequence of actions executed on a machine within the reference computer network during the malicious attack on the reference computer network;

execute a first behavior, stored in a first node in the set of nodes, corresponding to a first action in the sequence of actions representing the malicious attack;

record a first artifact in the set of artifacts corresponding to the first action in response to executing the first behavior;

execute a second behavior, stored in a second node in the set of nodes, corresponding to a second action in the sequence of actions representing the malicious attack;

record a second artifact in the set of artifacts corresponding to the second action in response to executing the second behavior;

attempt execution of a third behavior, stored in a third node in the set of nodes, corresponding to a third action in the sequence of actions representing the malicious attack;

exclude a third artifact from the set of artifacts corresponding to the third action in response to failed execution of the third behavior; and generate the context file comprising the set of artifacts in response to termination of the emulation of the malicious attack on the target computer network.

19. A method comprising:

accessing a set of data packets representing data transmitted between machines in communication with a reference computer network during a malicious attack on the reference computer network during a first time period;

selecting a set of assets as actors in an emulation of the malicious attack on a target computer network, the set of assets comprising:
  a first internal asset within the target computer network; and
  a second external asset external to the target computer network;

for each data packet in the set of data packets:
  assigning a behavior trigger, in a set of behavior triggers, to the data packet based on a corresponding behavior during the malicious attack on the reference computer network;
  assigning a recipient asset, in the set of assets, to receive the data packet; and
  assigning a source asset, in the set of assets, to transmit the data packet to the recipient asset according to the behavior trigger;

generating an executable file:
  comprising the set of data packets;
  defining the set of behavior triggers; and
  configured to trigger the first internal asset to generate a context file specifying a first set of artifacts according to a first format, the first set of artifacts representing indicators of the malicious attack responsive to:
    reception of data packets in the set of data packets at the first internal asset;
    transmission of data packets in the set of data packets from the first internal asset; and
    execution of behaviors corresponding to behavior triggers in the set of behavior triggers;

during a second time period succeeding the first time period and in response to execution of the executable file at the first internal asset, initiating transmission of the set of data packets from source assets to recipient assets, in the set of assets, according to the set of behavior triggers to emulate the malicious attack on the target network;

accessing the context file specifying the first set of artifacts and generated by the first internal asset in response to termination of the emulation of the malicious attack on the target computer network;

transforming the first set of artifacts into a second set of artifacts according to a second format associated with a target security technology deployed on the target computer network; and serving the second set of artifacts to the target security technology.

20. The method of claim 19, further comprising:

accessing a set of event records generated by the target security technology responsive to the second set of artifacts; and in response to absence of an event record in the set of event records indicating the malicious attack, generating a prompt to reconfigure the target security technology to detect the malicious attack at the target computer network.

* * * * *